United States Patent
Wager et al.

(10) Patent No.: US 11,323,321 B2
(45) Date of Patent: *May 3, 2022

(54) METHODS AND NETWORK NODE FOR ACTIVATION OF CONNECTION CONFIGURATION FOR A SECONDARY BASE STATION

(71) Applicant: Telefonaktiebolaget L M Ericsson (publ), Stockholm (SE)

(72) Inventors: Stefan Wager, Espoo (FI); Angelo Centonza, Winchester (GB); Mats Folke, Luleå (SE); Fredrik Gunnarsson, Linköping (SE); Riikka Susitaival, Helsinki (FI); Alexander Vesely, Feldbach (AT)

(73) Assignee: Telefonaktiebolaget LM Ericsson (Publ), Stickholm (SE)

( * ) Notice: Subject to any disclaimer, the term of this patent is extended or adjusted under 35 U.S.C. 154(b) by 236 days.

This patent is subject to a terminal disclaimer.

(21) Appl. No.: 16/126,747

(22) Filed: Sep. 10, 2018

(65) Prior Publication Data

US 2019/0007268 A1 Jan. 3, 2019

Related U.S. Application Data

(63) Continuation of application No. 14/391,272, filed as application No. PCT/SE2014/050769 on Jun. 19, 2014, now Pat. No. 10,091,821.

(Continued)

(51) Int. Cl.
H04W 76/15 (2018.01)
H04W 74/08 (2009.01)
(Continued)

(52) U.S. Cl.
CPC ....... *H04L 41/0816* (2013.01); *H04W 56/001* (2013.01); *H04W 74/0833* (2013.01); *H04W 76/15* (2018.02); *H04W 74/006* (2013.01)

(58) Field of Classification Search
CPC ............ H04L 41/0816; H04W 56/001; H04W 74/006; H04W 74/0833; H04W 76/15
See application file for complete search history.

(56) References Cited

U.S. PATENT DOCUMENTS

2010/0246529 A1   9/2010  Ishizu et al.
2010/0304737 A1*  12/2010  Jain ................... H04W 36/0066
                                                            455/426.1

(Continued)

FOREIGN PATENT DOCUMENTS

CN    102281633 A   12/2011
CN    102378198 A    3/2012
(Continued)

OTHER PUBLICATIONS

3GPP, "3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.3.0, Mar. 2013, pp. 1-344.

(Continued)

*Primary Examiner* — Noel R Beharry
*Assistant Examiner* — M Mostazir Rahman
(74) *Attorney, Agent, or Firm* — Christopher & Weisberg, P.A.

(57) ABSTRACT

A method performed in a wireless device for handling connectivity to two network nodes. The method comprises receiving, from a first network node, a radio resource configuration message, the radio resource configuration message indicating a change in configuration of a connec- (Continued)

tion towards a second network node; applying the change in configuration towards the second network node in response to the radio resource configuration message; and initiating a random access procedure towards the second network node after applying the change in configuration. The disclosure relates to corresponding wireless device, and to methods in network nodes, network nodes, computer programs and computer program products.

20 Claims, 16 Drawing Sheets

Related U.S. Application Data

(60) Provisional application No. 61/839,408, filed on Jun. 26, 2013.

(51) Int. Cl.
  *H04L 41/0816* (2022.01)
  *H04W 56/00* (2009.01)
  *H04W 74/00* (2009.01)

(56) References Cited

U.S. PATENT DOCUMENTS

| | | |
|---|---|---|
| 2012/0015656 A1 | 1/2012 | Tiwari |
| 2013/0088983 A1 | 4/2013 | Pragada et al. |
| 2013/0225168 A1 | 8/2013 | Singh et al. |
| 2014/0011519 A1* | 1/2014 | Lee ............... H04W 64/00 455/456.1 |
| 2014/0355562 A1* | 12/2014 | Gao ............... H04B 7/02 370/331 |
| 2016/0316508 A1* | 10/2016 | Hong ............... H04W 76/15 |

FOREIGN PATENT DOCUMENTS

| | | |
|---|---|---|
| CN | 102883440 A | 1/2013 |
| CN | 104919735 A | 9/2015 |
| WO | 2010123322 A2 | 10/2010 |
| WO | 2014112803 A1 | 7/2014 |
| WO | 2014182229 A1 | 11/2014 |

OTHER PUBLICATIONS

3GPP, "3rd Generation Partnership Project; Technical Specification Group Radio Access Network; Evolved Universal Terrestrial Radio Access (E-UTRA); Study on Small Cell Enhancements for E-UTRA and E-UTRAN—Higher layer aspects (Release 12)", 3GPP TR 36.842 V0.2.0, May 2013, 1-38.

3GPP, "Further discussion and comparison between CP architecture options C1 and C2", Intel Corporation, 3GPP TSG-RAN2 Meeting #83, R2-132820, Barcelona, Spain, Aug. 19-23, 2013, 1-6.

3GPP , "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)," 3GPP TS 36.300 V11.5.0, Mar. 2013, pp. 1-209.

Unknown, Author , "Discussion on U-plane delay", CATT, 3GPP TSG RAN WG2 Meeting #82, R2-131873, Fukuoka, Japan, May 20-24, 2013, 1-7.

Unknown, Author , "Heterogeneous Network Deployment Scenarios", Ericsson, ST-Ericsson, 3GPP TSG-RAN WG1 #70bis, R1-124513, San Diego, CA, USA, Oct. 8-12, 2012, 1-3.

Unknown, Author , "Initial considerations on Heterogeneous Networks for UMTS", 3GPP TSG RAN WG1 Meeting #70bis, R1-124512, Ericsson, ST-Ericsson, San Diego, CA, USA, Oct. 8-12, 2012, 1-7.

Unknown, Author , "Introduction of Dual Connectivity—Change Request", NTT Docomo, 3GPP TSG-RAN WG2 #85, R2-140936, Prague, Czech Republic, Feb. 10-14, 2014, 1-46.

Unknown, Author, "Proposed SID: Study on UMTS Heterogeneous Networks", TSG RAN Meeting #57, RP-121436, Huawei, HiSilicon, Chicago, USA, Sep. 4-7, 2012, 1-6.

* cited by examiner

Control Plane
Option 1

METHODS AND NETWORK NODE FOR ACTIVATION OF CONNECTION CONFIGURATION FOR A SECONDARY BASE STATION

TECHNICAL FIELD

The present disclosure is directed to wireless communications and, more particularly, to addressing connectivity issues in wireless communications networks that support simultaneous connections of a wireless device to two base stations.

BACKGROUND

In a typical cellular radio system, wireless terminals (also referred to as user equipment unit nodes, UEs, mobile terminals, and/or mobile stations) communicate via a radio access network (RAN) with one or more core networks, which provide access to data networks, such as the Internet, and/or the public-switched telecommunications network (PSTN). The RAN covers a geographical area that is divided into cell areas, with each cell area being served by a radio base station (also referred to as a base station, a RAN node, a "NodeB", and/or enhanced NodeB "eNodeB"). A cell area is a geographical area where radio coverage is provided by the base station equipment at a base station site. The base stations communicate through radio communication channels with wireless terminals within range of the base stations.

Cellular communications system operators have begun offering mobile broadband data services based on, for example, WCDMA (Wideband Code Division Multiple Access), HSPA (High Speed Packet Access), and Long Term Evolution (LTE) wireless technologies. Moreover, fueled by introduction of new devices designed for data applications, end user performance requirements are steadily increasing. The increased adoption of mobile broadband has resulted in significant growth in traffic handled by high-speed wireless data networks. Accordingly, techniques that allow cellular operators to manage networks more efficiently are desired.

Techniques to improve downlink performance may include 4-branch MIMO, multiflow communication, multi carrier deployment, etc. Since spectral efficiencies per link may be approaching theoretical limits, next steps may include improving spectral efficiencies per unit area. Further efficiencies for wireless networks may be achieved, for example, by changing a topology of traditional networks to provide increased uniformity of user experiences throughout a cell. Currently, so-called heterogeneous networks are being developed for 3GPP as discussed, for example, in: RP-121436, Study on UMTS Heterogeneous Networks, TSG RAN Meeting #57, Chicago, USA, 4th-7th September 2012; R1-124512, Initial considerations on Heterogeneous Networks for UMTS, Ericsson, ST-Ericsson, 3GOO TSG RAN WG1 Meeting #70bis, San Diego, Calif., USA, 8th-12th Oct. 2012; and R1-124513, Heterogeneous Network Deployment Scenarios, Ericsson, ST-Ericsson, 3GPP TSG-RAN WG1 #70bis, San Diego, Calif., USA, 8th-12th Oct. 2012.

A homogeneous network is a network of base stations (also referred to as NodeB's, enhanced NodeB's, or eNBs) in a planned layout, providing communications services for a collection of user terminals (also referred to as user equipment nodes, UEs, and/or wireless terminals) in which all base stations may have similar transmit power levels, antenna patterns, receiver noise floors, and/or backhaul connectivity to the data network. Moreover, all base stations in a homogeneous network may offer unrestricted access to user terminals in the network, and each base station may serve roughly a same number of user terminals. Current cellular wireless communications systems in this category may include, for example, GSM (Global System for Mobile communication), WCDMA, HSDPA (High Speed Downlink Packet Access), LTE (Long Term Evolution), Wimax (Worldwide Interoperability for Microwave Access), etc.

In a heterogeneous network, low power base stations (also referred to as low power nodes, LPNs, micro nodes, pica nodes, femto nodes, relay nodes, remote radio unit nodes, RRU nodes, small cells, RRUs, etc.) may be deployed along with or as an overlay to planned and/or regularly placed macro base stations. A macro base station MBS may thus provide service over a relatively large macro cell area and each LPN may provide service for a respective relatively small LPN cell area within the relatively large macro cell area. Power transmitted by an LPN (e.g., 2 Watts) may be relatively small compared to power transmitted by a macro base station (e.g., 40 Watts for a typical macro base station). An LPN may be deployed, for example, to reduce/eliminate a coverage hole(s) in the coverage provided by the macro base stations, and/or to off-load traffic from macro base stations (e.g., to increase capacity in a high traffic location, also referred to as a hot-spot). Due to the lower transmit power and smaller physical size, an LPN may offer greater flexibility for site acquisition.

SUMMARY

In initial discussions among members of the 3rd-Generation Partnership Project (3GPP) regarding the development of Release 12 specifications for LTE, one of the proposed items for study is the possibility of simultaneously serving a User Equipment (UE) from more than one eNB. In the disclosure that follows, this is called "dual connectivity." The control plane procedures of LTE have to be updated in order to support this.

With dual connectivity, activation of a new configuration might encounter difficulties. For example, a UE may be connected to a master eNB (MeNB) and add connectivity to a secondary eNB when given the opportunity, e.g. when being within coverage of a LPN providing the UE a capacity boosting by means of an additional radio resources. With two (or more) such connections, the UE may keep the control signaling connection only with the MeNB, and only the master eNB (MeNB) then knows when a reconfiguration towards the SeNB has been applied by the UE. The MeNV needs to inform the SeNB that the UE has applied the reconfiguration. However, meanwhile the UE may continue to communicate using the radio resources of the SeNB. The configuration for this communication can be old or new, which is not known by the SeNB. One possibility would be to indicate an activation time, as used in e.g. 3G/HSPA, upon which the configuration is to be applied. However, such an activation time must be set conservatively to ensure that the UE will receive the configuration before activation, and thus this increases the delay of radio resource reconfiguration.

An object of the present disclosure is to solve or at least alleviate at least one of the above mentioned problems.

The object is according to a first aspect achieved by a method performed in a wireless device for handling connectivity to two network nodes. The method comprises: receiving, from a first network node, a radio resource configuration message, the radio resource configuration message indicating a change in configuration of a connection towards a second network node; applying the change in configuration towards the second network node in response to the radio resource configuration message; and initiating a random access procedure towards the second network node after applying the change in configuration.

The method enables changing a connection configuration towards the second network node in a dual connectivity setup. The method ensures that the second network node and the wireless device change to the new configuration at the same time, and provides a delay efficient way for reconfiguration. By initiating the random access procedure towards the second network node, upon having executed the reconfiguration, the second network node is made aware of the fact that the wireless device has received and applied the new configuration, i.e. that the wireless device has changed to the new configuration.

The object is according to a second aspect achieved by a wireless device for handling connectivity to two network nodes. The wireless device is configured to: receive, from a first network node, a radio resource configuration message, the radio resource configuration message indicating a change in configuration of a connection towards a second network node; apply the change in configuration towards the second network node in response to the radio resource configuration message, and initiate a random access procedure towards the second network node after applying the change in configuration.

The object is according to a third aspect achieved by a computer program for a wireless device for handling connectivity to two network nodes. The computer program comprises computer program code, which, when executed on at least one processor on the wireless device causes the wireless device to perform the method of the first aspect above.

The object is according to a fourth aspect achieved by a computer program product comprising a computer program as above and a computer readable means on which the computer program is stored.

The object is according to a fifth aspect achieved by a method performed in a first network node, for managing connectivity of a wireless device to the first network node and a second network node. The method comprises receiving, from the second network node, radio resource configuration information for a connection between the wireless device and the second network node; sending in response to and based on the radio resource configuration information received from the second network node, a radio resource configuration message to the wireless device, the radio resource configuration message indicating a change in configuration of a connection towards the second network node; and receiving a message from the wireless device, the message indicating that the change in configuration is complete.

The object is according to a sixth aspect achieved by a first network node for managing connectivity of a wireless device to the first network node and a second network node. The first network node is configured to: receive, from the second network node, radio resource configuration information for a connection between the wireless device and the second network node; send in response to and based on the radio resource configuration information received from the second network node, a radio resource configuration message to the wireless device, the radio resource configuration message indicating a change in configuration of a connection towards the second network node; and receive a message from the wireless device, the message indicating that the change in configuration is complete.

The object is according to a seventh aspect achieved by a computer program for a first network node for managing connectivity of a wireless device to the first network node and a second network node. The computer program comprises computer program code, which, when executed on at least one processor on the first network node causes the first network node to perform the method according to the fifth aspect above.

The object is according to an eight aspect achieved by a computer program product comprising a computer program as above, and a computer readable means on which the computer program is stored.

The object is according to a ninth aspect achieved by a method performed in a second network node, for managing connectivity of a wireless device to a first network node and the second network node. The method comprises sending, to the first network node, radio resource configuration information for a connection between the wireless device and the second network node; receiving a random access preamble from the wireless device, responsive to the radio resource configuration information; and sending a random access response to the wireless device.

The object is according to a tenth aspect achieved by a second network node for managing connectivity of a wireless device to a first network node and the second network node. The second network node is configured to: send, to the first network node, radio resource configuration information for a connection between the wireless device and the second network node; receive a random access preamble from the wireless device, responsive to the radio resource configuration information; and send a random access response to the wireless device.

The object is according to an eleventh aspect achieved by a computer program for a second network node for managing connectivity of a wireless device to a first network node and the second network node. The computer program comprises computer program code, which, when executed on at least one processor on the second network node causes the second network node to perform the method according to the ninth aspect above.

The object is according to a twelfth aspect achieved by a computer program product comprising a computer program as above, and a computer readable means on which the computer program is stored.

Further aspects, features and advantages of the present disclosure will become clear upon reading the following description and the accompanying drawings.

DETAILED DESCRIPTION

Figure 1:
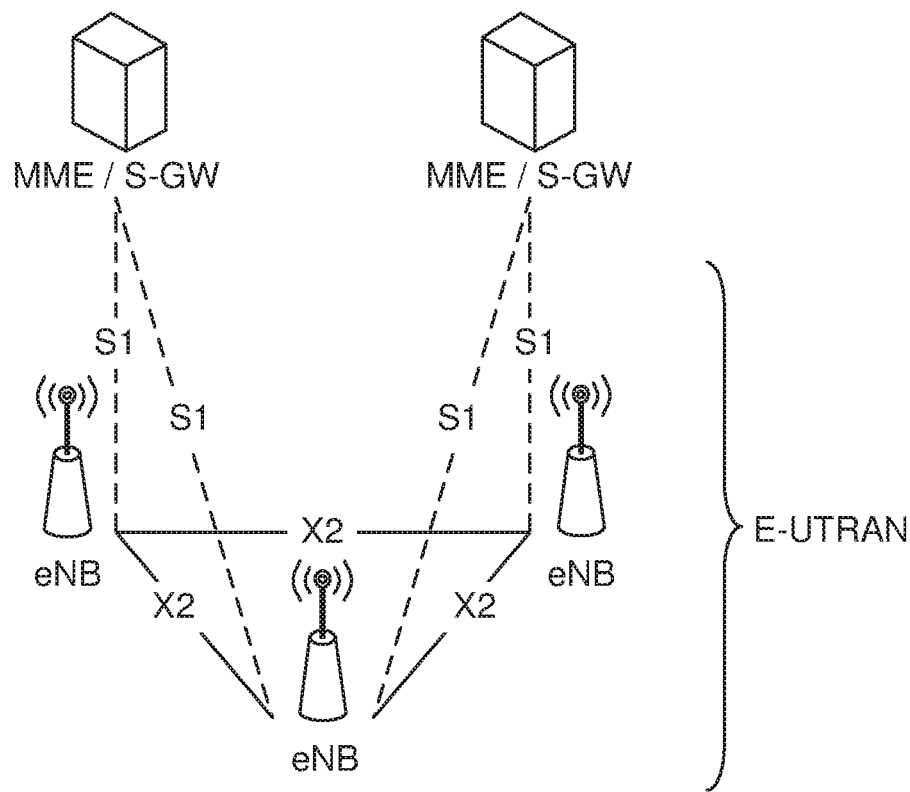
FIG. 1 is a schematic/block diagram illustrating the overall E-UTRAN architecture.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present or used in another embodiment.

For purposes of illustration and explanation only, these and other embodiments of present inventive concepts are described herein in the context of operating in a Radio Access Network (RAN) that communicates over radio communication channels with wireless terminals (also referred to as UEs). It will be understood, however, that present inventive concepts are not limited to such embodiments and may be embodied generally in any type of communication network. As used herein, a wireless terminal or UE can include any device that receives data from a communication network, and may include, but is not limited to, a mobile telephone ("cellular" telephone), laptop/portable computer, pocket computer, hand-held computer, desktop computer, a machine to machine (M2M) or MTC type device, a sensor with a wireless communication interface, etc.

In the following, aspects are described for facilitating thorough understanding of the context of the present disclosure.

In some embodiments of a RAN, several base stations may be connected (e.g., by landlines or radio channels) to a radio network controller (RNC). A radio network controller, also sometimes termed a base station controller (BSC), may supervise and coordinate various activities of the plural base stations connected thereto. A radio network controller may be connected to one or more core networks. According to some other embodiments of a RAN, base stations may be connected to one or more core networks without a separate RNC(s) therebetween, for example, with functionally of an RNC implemented at base stations and/or core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) technology. UTRAN, short for UMTS Terrestrial Radio Access Network, is a collective term for the Node B's and Radio Network Controllers which make up the UMTS radio access network. Thus, UTRAN is essentially a radio access network using wideband code division multiple access for UEs.

The Third Generation Partnership Project (3GPP) has undertaken to further evolve the UTRAN and GSM based radio access network technologies. In this regard, specifications for the Evolved Universal Terrestrial Radio Access Network (E-UTRAN) are ongoing within 3GPP. The Evolved Universal Terrestrial Radio Access Network (E-UTRAN) comprises the Long Term Evolution (LTE) and System Architecture Evolution (SAE).

Note that although terminology from WCDMA and/or HSPA is used in this disclosure to exemplify embodiments of the inventive concepts, this should not be seen as limiting the scope of inventive concepts to only these systems. Other wireless systems, including 3GPP (3rd Generation Partnership Project) LTE (Long Term Evolution), WiMax (Worldwide Interoperability for Microwave Access), UMB (Ultra Mobile Broadband), HSDPA (High-Speed Downlink Packet Access), GSM (Global System for Mobile Communications), etc., may also benefit from exploiting embodiments of present inventive concepts disclosed herein.

Also note that terminology such as base station (also referred to as NodeB, eNodeB, or Evolved Node B) and wireless terminal (also referred to as User Equipment node or UE) should be considering non-limiting and does not imply a certain hierarchical relation between the two. In general, a base station (e.g., a "NodeB" or "eNodeB") and a wireless terminal (e.g., a "UE") may be considered as examples of respective different communications devices that communicate with each other over a wireless radio channel. While embodiments discussed herein may focus on wireless transmissions in a downlink from a NodeB to a UE, embodiments of inventive concepts may also be applied, for example, in an uplink. Furthermore, although the description below focuses, for purposes of illustration, on example embodiments in which described solutions are applied in heterogeneous networks that include a mix of relatively higher-power (e.g., "macro") base stations and relatively lower-power node (e.g., "pico") base stations, the described techniques may be applied in any suitable type of network, including both homogeneous and heterogeneous configurations. Thus, the base stations involved in the described configurations may be similar or identical to one another, or may differ in terms of transmission power, number of transmitter-receiver antennas, processing power, receiver and transmitter characteristics, and/or any other functional or physical capability.

With the proliferation of user friendly smart phones and tablets, the usage of high data rate services such as video streaming over the mobile network is becoming commonplace, greatly increasing the amount of traffic in mobile networks. Thus, there is a great urgency in the mobile network community to ensure that the capacity of mobile networks keeps up increasing with this ever-increasing user demand. The latest systems such as Long Term Evolution (LTE), especially when coupled with interference mitigation techniques, have spectral efficiencies very close to the theoretical Shannon limit. The continuous upgrading of current networks to support the latest technologies and densifying the number of base stations per unit area are two of the most widely used approaches to meet the increasing traffic demands.

Yet another approach that is gaining high attention is to use Heterogeneous Networks where the traditional pre-planned macro base stations (known as the macro layer) are complemented with several low-powered base stations that may be deployed in a relatively unplanned manner. The 3rd Generation Partnership Project (3GPP) has incorporated the concept of Heterogeneous Networks as one of the core items of study in the latest enhancements of LTE, such as LTE release 11, and several low-powered base stations to realize heterogeneous networks such as pico base stations, femto (base stations (also known as home base stations or HeNBs), relays, and RRHs (remote radio heads) have been defined.

Initial discussions for LTE release 12 have begun, and one of the proposed items for study is the possibility of serving a User Equipment node (also referred to as a UE, a wireless terminal, etc.) from more than one eNB (also referred to as a base station) simultaneously. The current legacy handover mechanisms of LTE may have to be updated to support this.

The Evolved UMTS Terrestrial Radio Access Network (E-UTRAN) includes base stations called enhanced NodeBs (eNBs or eNodeBs), providing the E-UTRA user plane and control plane protocol terminations towards the UE. The eNBs are interconnected with each other using the X2 interface. The eNBs are also connected using the S1 interface to the EPC (Evolved Packet Core), more specifically to the MME (Mobility Management Entity) by means of the S1-MME interface and to the Serving Gateway (S-GW) by means of the S1-U interface. The S1 interface supports many-to-many relation between MMEs/S-GWs and eNBs. The E-UTRAN architecture is illustrated in FIG. 1.

The eNB hosts functionalities such as Radio Resource Management (RRM), radio bearer control, admission control, header compression of user plane data towards serving gateway, and/or routing of user plane data towards the serving gateway. The MME is the control node that processes the signaling between the UE and the CN (core network). Significant functions of the MME are related to connection management and bearer management, which are handled via Non Access Stratum (NAS) protocols. The S-GW is the anchor point for UE mobility, and also includes other functionalities such as temporary DL (down link) data buffering while the UE is being paged, packet routing and forwarding to the right eNB, and/or gathering of information for charging and lawful interception. The PDN Gateway (P-GW) is the node responsible for UE IP address allocation, as well as Quality of Service (QoS) enforcement (as further discussed below).

Figure 2:
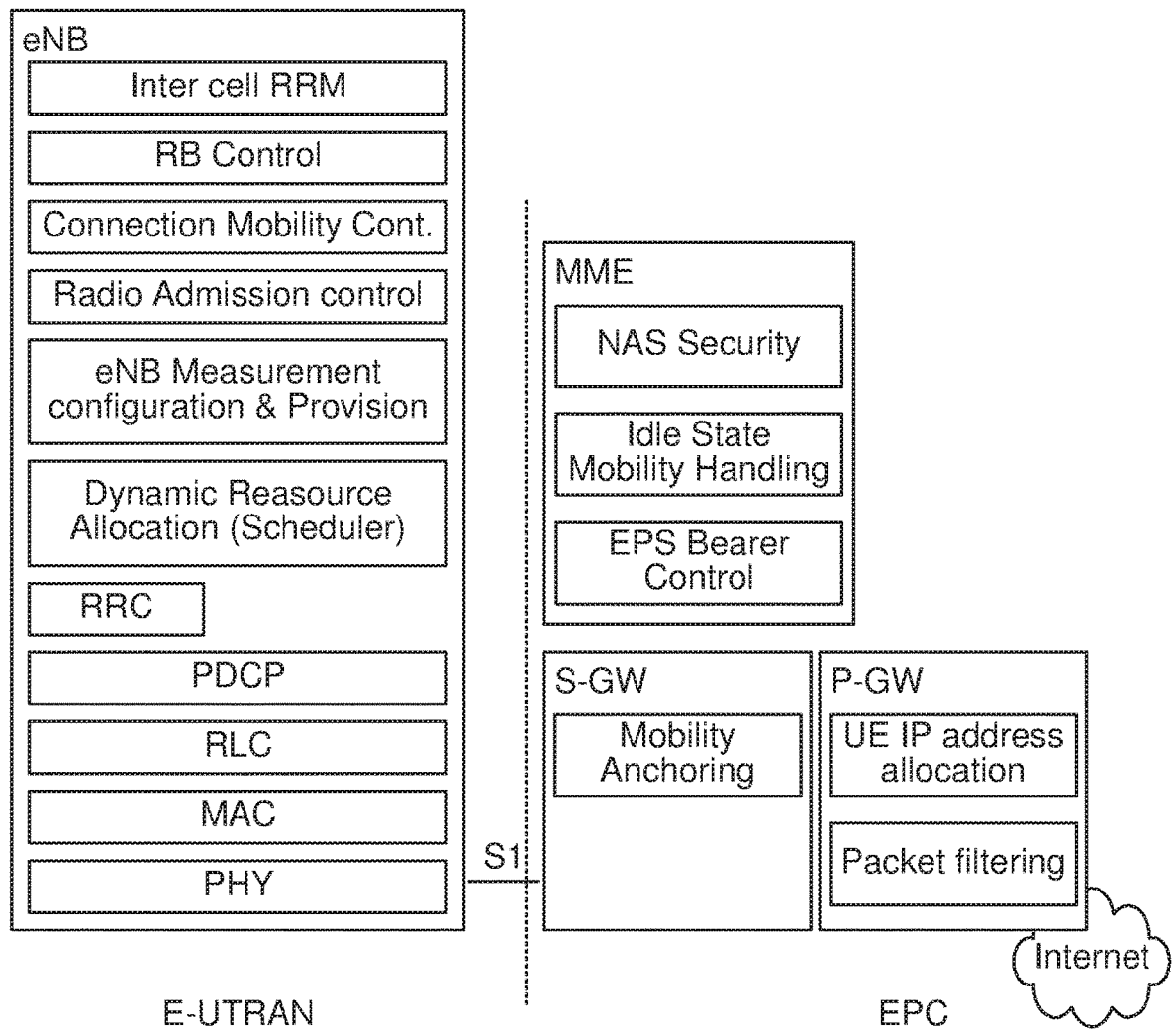
FIG. 2 is a block diagram illustrating a functional split between E-UTRAN and the Evolved Packet Core (EPC).

FIG. 2 illustrates a summary of functionalities of the different nodes, and the reader is referred to 3GPP TS 36.300 v11.5.0 and the references therein for further details of functionalities of the different nodes. In FIG. 2, blocks eNB, MMe, S-GW, and P-GW illustrate logical nodes; blocks Inter Cell RRM, RB Control, Connection Mobility Cont., Radio Admission. Control, eNB Measurement Configuration & Provision, Dynamic Resource Allocation (Scheduler), NAS Security, Idle State Mobility Handling, EPS bearer Control, Mobility Anchoring, UE IP address allocation, and Packet Filtering illustrate functional entities of the control plane; and blocks RRC, PDCP, RLC, MAC, and PHY illustrate the radio protocol layers.

Figure 3:
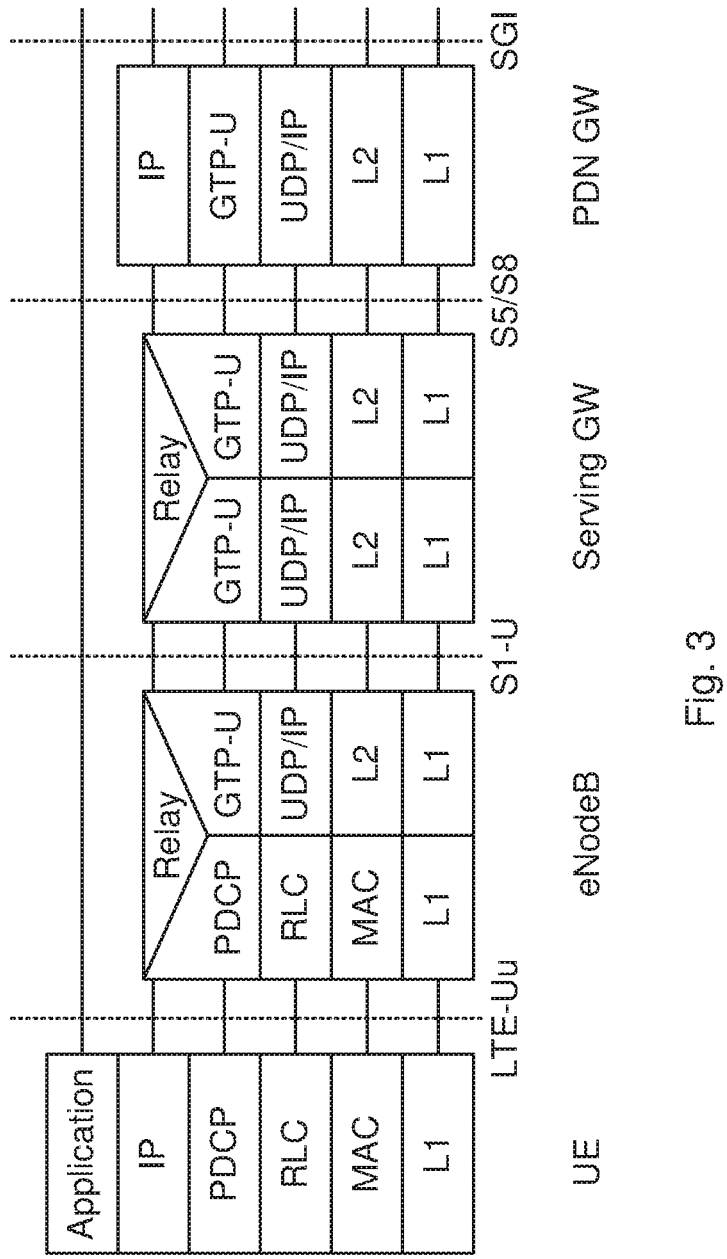
FIG. 3 is a schematic diagram illustrating a user plane protocol stack.

The radio protocol architecture of E-UTRAN is divided into the user plane and the control plane. FIG. 3 illustrates the protocol stack for the user-plane. The user plane protocol stack includes the Packet Data Convergence Protocol (PDCP), Radio Link Control (RLC), and Medium Access Control (MAC), which are terminated at the eNB. The PDCP manages IP packets in the user plane and it performs functionalities such as header compression, security, and re-ordering and retransmission during handover. The RLC layer is mainly responsible for segmentation (and corresponding assembly) of PDCP packets, so that they fit the size that is actually to be transmitted over the air interface. RLC can operate either in unacknowledged mode or acknowledged mode, where the latter supports retransmissions. The MAC layer performs multiplexing of data from different radio bearers, and it is the one that informs the RLC about the size of the packets to provide, which is decided based on the required QoS (Quality of Service) of each radio bearer and the current capacity available to the UE.

Figure 4:
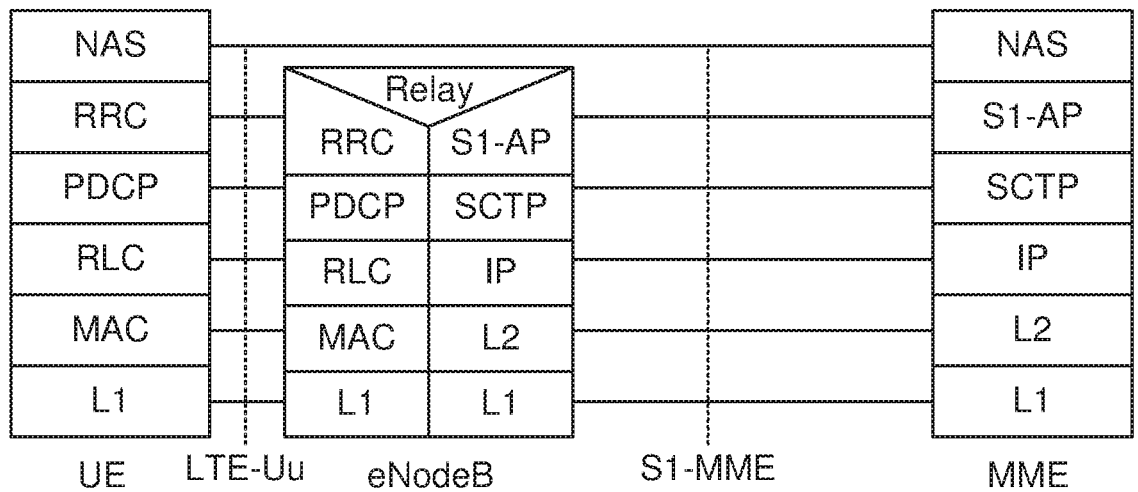
FIG. 4 is a schematic diagram illustrating a control plane protocol stack.

FIG. 4 illustrates the control plane protocol stack. The layers below the Radio Resource Control (RRC) layer perform the same functionality as in the user plane, except that there is no header compression in the control plane. The main functions of the RRC are the broadcasting of system information, RRC connection control (establishment, modification, and release of RRC connection, establishment of signaling radio bearers (SRB) and data radio bearers (DRBs), handover, configuration of lower protocol layers, radio link failure recovery, etc.), and measurement configuration and reporting. Details of the RRC protocol functionalities and procedures can be found in 3GPP TS 36.331 v11.3.0.

A UE is uniquely identified over the S1 interface within an eNB with the eNB UE S1AP ID. When an MME receives an eNB UE S1AP ID, the MME stores it for the duration of the UE-associated logical S1-connection for this UE. Once known to an MME, this IE (information element) is included in all UE-associated S1-AP signaling. The eNB UE S1AP ID is unique within the eNB, and a UE is assigned a new S1AP ID after a handover by the target eNB.

From the MME side, a UE is uniquely identified using the MME UE S1AP ID. When an eNB receives MME UE S1AP ID, the eNB stores it for the duration of the UE-associated logical S1 connection for this UE. Once known to an eNB, this IE is included in all UE-associated S1-AP signaling. The MME UE S1AP ID is unique within the MME, and it is changed if the UE's MME changes (for example, handover between two eNBs connected to different MMEs).

Figure 5:
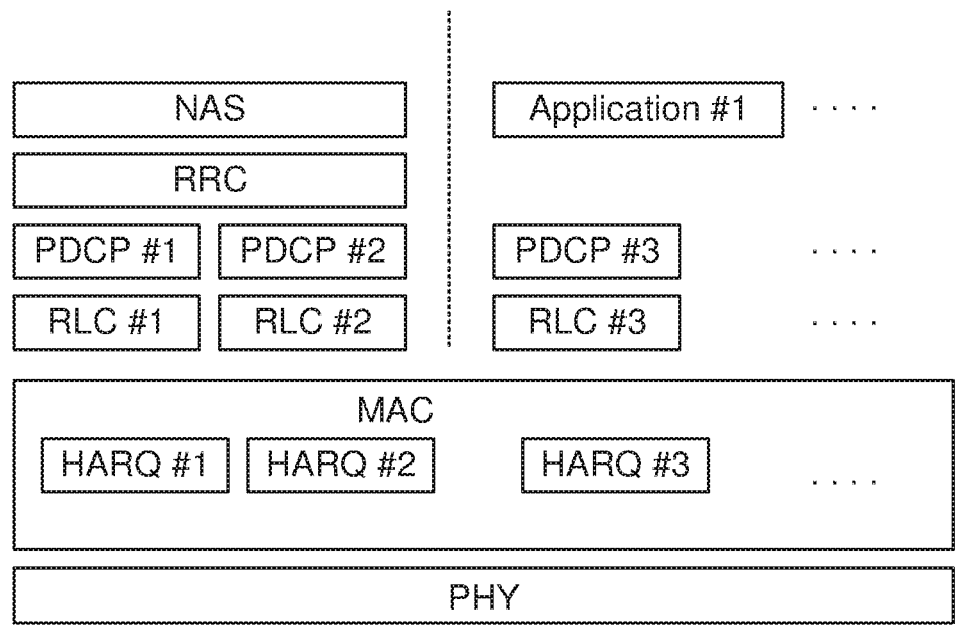
FIG. 5 is a block diagram illustrating user plane and control plane data flows.

The flow of user plane and control plane data is illustrated in FIG. 5. There is only one MAC entity per UE (unless the UE supports multiple carriers in the case of carrier aggregation), and under this MAC entity several Hybrid ARQ (HARQ) processes might be running simultaneously, for rapid retransmissions. There is a separate RLC entity for each radio bearer and if the radio bearer is configured to use PDCP, there is also one separate PDCP entity for that bearer. A bearer is configured to use PDCP only if it is dedicated to a UE. In other words, multicast and broadcast data do not utilize PDCP both in the control and user plane, and the PDCP is used only for dedicated control message in the control plane and for dedicated UL/DL data in the user plane.

At the transmitting side, each layer receives a Service Data Unit (SDU) from a higher layer, and sends a Protocol Data Unit (PDU) to the lower layer. For example, PDCP PDUs are sent towards the RLC, and they are RLC SDUs from RLC point of view, which in turn sends RLC PDUs towards the MAC, which are MAC SDUs from the MAC point of view. At the receiving end, the process is reversed (i.e., each layer passing SDUs to the layer above it, where they are perceived as PDUs).

A UE can have multiple applications running at the same time, each having different QoS (Quality of Service) requirements (for example, VoIP, browsing, file download, etc.). To support these different requirements, different bearers are set up, each being associated with a respective QoS. An EPS bearer/E-RAB (Radio Access Bearer) is the level of granularity for bearer level QoS control in the EPC/E-UTRAN. That is, Service Data Flows (SDF) mapped to the same EPS bearer receive the same bearer level packet forwarding treatment (e.g. scheduling policy, queue management policy, rate shaping policy, RLC configuration, etc.).

One EPS bearer/E-RAB is established when the UE connects to a PDN (Packet Data Network), and that remains established throughout the lifetime of the PDN connection to provide the UE with always-on IP connectivity to that PDN. That bearer is referred to as the default bearer. Any additional EPS bearer/E-RAB that is established to the same PDN is referred to as a dedicated bearer. The initial bearer level QoS parameter values of the default bearer are assigned by the network, based on subscription data. The decision to establish or modify a dedicated bearer can only be taken by the EPC, and the bearer level QoS parameter values are always assigned by the EPC.

The packets of an EPS bearer are transported over a radio bearer between the UE and eNB. An S1 bearer transports the packets of an EPS bearer between the eNB and S-GW. An E-RAB is actually a concatenation of these two bearers (i.e., radio bearer and S1 bearer), and the two bearers are mapped on a one to one fashion. An S5/S8 bearer transports the packets of the EPS bearer between the S-GW and P-GW, and completes the EPS bearer. Here also there is a one to one mapping between the E-RAB and S5/S8 bearer.

Heterogeneous Networks and Dual/Multiple Connectivity

Figure 6:
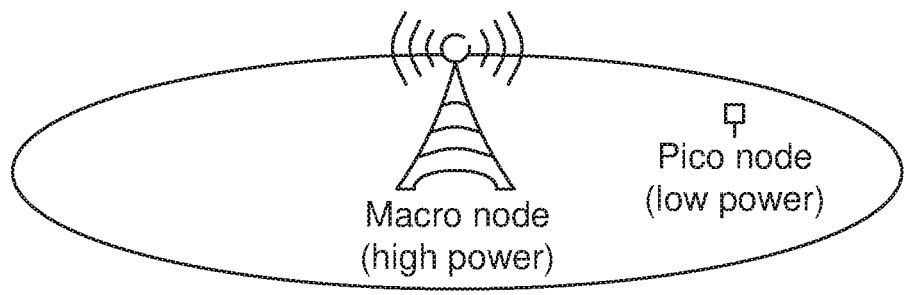
FIG. 6 is a schematic diagram illustrating a heterogeneous deployment with a higher-power macro node and a lower-power pico node according to some embodiments.

A heterogeneous deployment or heterogeneous network, as illustrated in FIG. 6, includes network transmission nodes (e.g., micro and pico nodes or base stations) operating with different transmit powers and with overlapping coverage areas. A heterogeneous deployment/network is considered as an interesting deployment strategy for cellular networks. In such a deployment, the low-power nodes ("pico nodes") are typically assumed to offer high data rates (Mbit/s) and/or to provide increased/high capacity (users/m2 or Mbit/s/m2) in the local areas where increased data rates/capacity is/are needed/desired, while the high-power nodes ("macro nodes") are assumed to provide full-area coverage. In practice, the macro nodes may correspond to currently deployed macro cells while the pico nodes are later deployed nodes, provided to extend capacity and/or achievable data rates within the macro-cell coverage area where needed/desired. FIG. 6 illustrates a heterogeneous deployment with a higher-power macro node and a lower-power pico node. In a typical case, there may be multiple pico nodes within the coverage area of a macro node.

Figure 7:
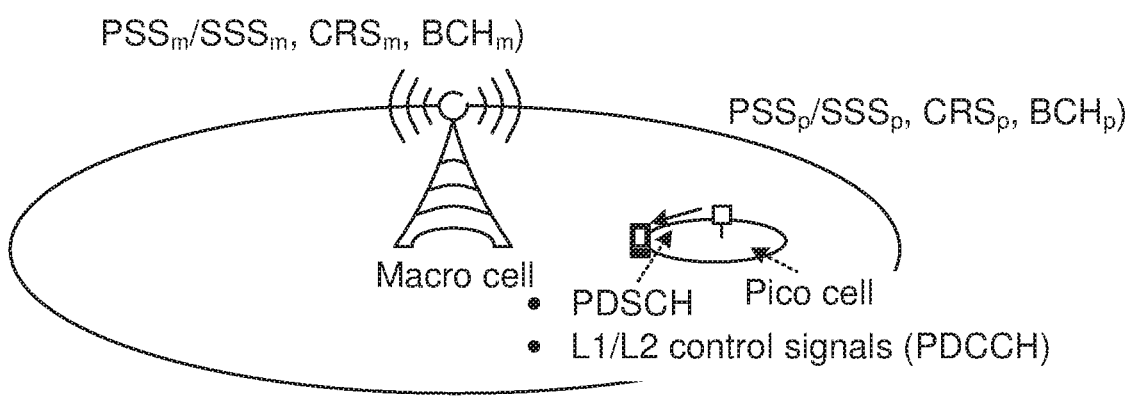
FIG. 7 is a schematic diagram illustrating an example heterogeneous deployment where the pico node corresponds to a cell of its own (a "pico cell"). The indices "p" and "m" indicate common signals/channels for the pico and macro cell respectively.

FIG. 7 illustrates heterogeneous deployment where the pico node corresponds to a cell of its own (a "pico cell"). The indices "p" and "m" indicate common signals/channels for the pico and macro cell respectively. A pico node of a heterogeneous deployment may operate as a cell of its own (a "pico cell") as shown in FIG. 7. This means that, in addition to downlink and uplink data transmission/reception, the pico node also transmits the full set of common signals/channels associated with a cell. In the LTE context this full set of common signals/channels includes:

The Primary and Secondary Synchronization Signals (PSS and SSS) corresponding to the Physical Cell Identity of the pico cell.

The Cell-specific reference signals (CRS), also corresponding to the Physical Cell Identity of the cell. The CRS can, for example, be used for downlink channel estimation to enable coherent demodulation of downlink transmissions.

The Broadcast channel (BCH), with corresponding pico-cell system information. Additional system information may also be transmitted on the PDSCH physical channel.

As the pico node transmits the common signals/channels, the corresponding pico cell can be detected and selected (connected to) by a terminal (UE, user equipment).

If the pico node corresponds to a cell of its own, also so-called L1/L2 control signaling on the Physical Downlink Control Channel of PDCCH (as well as Physical Control Format Indicator Channel or PCFICH and Physical Hybrid-AN Indicator Channel or PHICH) are transmitted from the pico node to connected terminals, in addition to downlink data transmission on the Physical Downlink Shared Channel or PDSCH. The L1/L2 control signaling, for example, provides downlink and uplink scheduling information and Hybrid-ARQ-related information to terminals within the cell. This is shown in FIG. 7.

FIG. 7 illustrates a heterogeneous deployment where the pico node corresponds to a cell of its own (a "pico cell"). The indices "p" and "m" indicate common signals/channels for the pico and macro cell respectively. As shown in FIG. 7, the pico node uses/transmits its own primary and secondary synchronization signals PSSp and SSSp, cell specific reference signals CRSp, and broadcast channel BCHp that are independent of (e.g., different than) the primary and secondary synchronization signals PSSm and SSSm, cell specific reference signals CRSm, and broadcast channel BCHm used/transmitted by the macro node. Accordingly, the UE may communicate through the pico node without support from the macro node.

Figure 8:
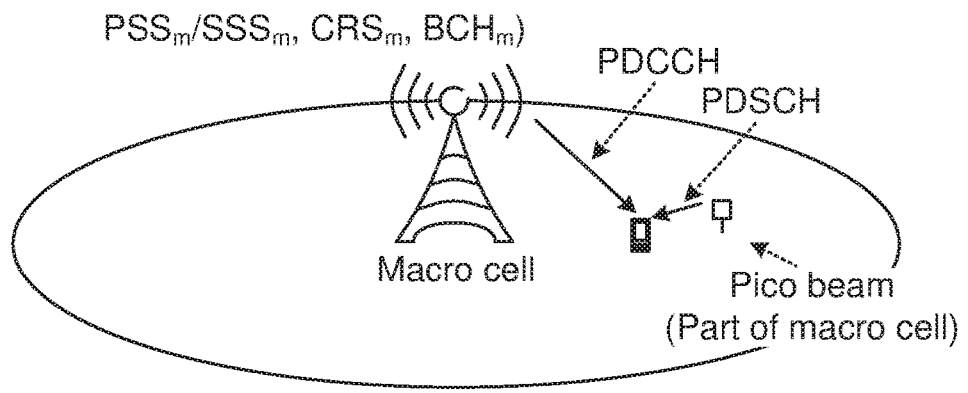
FIG. 8 is a schematic diagram illustrating an example heterogeneous deployment where the pico node does not correspond to a cell of its own.

Alternatively, a pico node within a heterogeneous deployment may not correspond to a separate cell of its own, but may instead provide a data-rate and/or capacity "extension" of the overlaid macro cell. This is sometimes known as "shared cell" or "soft cell". In this case, at least the CRS, PBCH (physical broadcast channel), PSS and SSS are transmitted from the macro node (but not the pico node). The PDSCH (physical downlink shared channel) can be transmitted from the pico node. To allow for demodulation and detection of the PDSCH, despite the fact that no CRS is transmitted from the pico node, DM-RS (downlink modulation reference signal) may be transmitted from the pico node together with the PDSCH. The UE-specific reference signals can then be used by the terminal for PDSCH demodulation/detection. This is shown in FIG. 8, which illustrates a heterogeneous deployment where the pico node does not correspond to or define a cell of its own.

Figure 9:
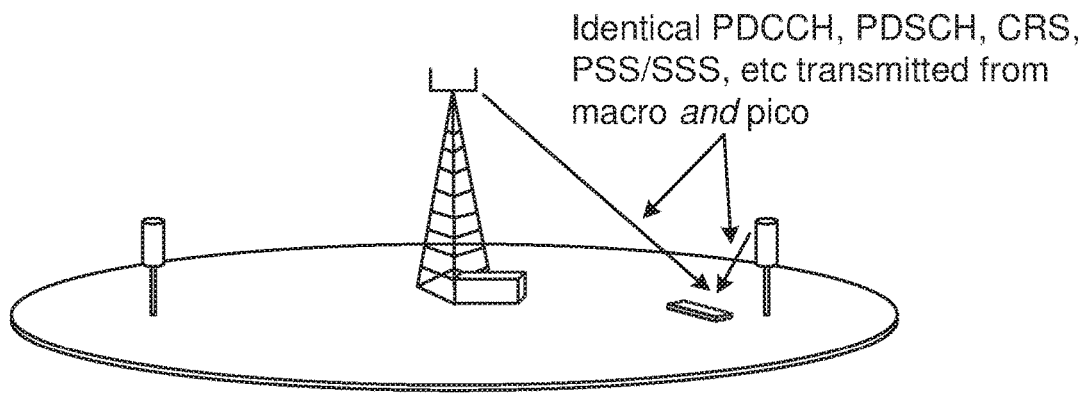
FIG. 9 is a schematic diagram illustrating single-frequency network (SFN) operation with identical transmission from macro and pico nodes to a wireless terminal according to some embodiments.
Figure 10:
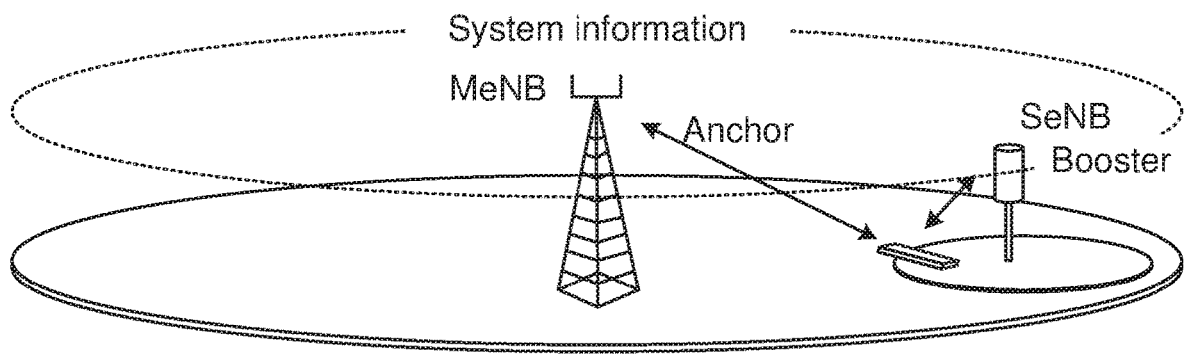
FIG. 10 is a schematic diagram illustrating dual connectivity operation with the UE (wireless terminal) having multiple connections with both the master (macro) and secondary (pico) nodes according to some embodiments.

Transmitting data from a pico node not transmitting CRS as described above may require DM-RS support in/at the wireless terminal UE ("non-legacy terminal"). In LTE, DM-RS-based PDSCH reception is supported in Rel-10 and for FDD while for the L1/L2 control signaling, DM-RS-based reception is planned for Rel-11. For terminals not supporting DM-RS-based reception ("legacy terminals") one possibility in a shared cell setting is to exploit SFN-type (Single Frequency Network type) of transmission. In essence identical copies of the signals and channels necessary for a legacy terminal are transmitted simultaneously from the macro and pico nodes. From a terminal perspective, this will look as a single transmission. Such an operation (i.e. SFN operation with identical transmission from macro and pico to a terminal), which is illustrated in FIG. 9, may only provide an SINR gain, which can be translated into a higher data rate but not a capacity improvement, because transmission resources cannot be reused across sites within the same cell. As shown in FIG. 10, SFN operation may be provided with identical transmissions from macro and pico to a wireless terminal UE.

Assume that the macro nodes are able to provide coverage and the pico nodes are provided only for capacity enhancements (i.e., to reduce coverage holes), another alternative architecture is where the UE maintains connectivity to the macro node, or, more generally, the "Master eNB" (MeNB), all the time, and adds connectivity to the pico node, or, more generally, the "Secondary eNB" (SeNB), when it is in the coverage area of the pico node. The link between the UE and the MeNB may be referred to as the "anchor" link, while the link between the UE and SeNB can be referred to as the "booster" link. When both connections are active, the anchor link can be used for control signaling while the booster link is used for data. In addition, it may also be possible to send data via the anchor link. This is illustrated in FIG. 10, i.e. dual connectivity operation with the UE having simultaneous active connections with both the master and secondary base stations. In this case, as in the previous cases, the system information is shown to be sent only from the MeNB, but it is still possible to send it also from the SeNB. As shown in FIG. 10, in soft cell operation, the UE may have multiple connections with both the anchor and booster nodes (also referred to as the macro and pico nodes).

Protocol Architecture Dual Connectivity

The term "dual connectivity" is used to refer to operation where the UE consumes radio resources provided by at least two different network points connected with non-ideal backhaul. Furthermore, each eNB involved in dual connectivity for a UE may assume different roles. Those roles do not necessarily depend on the eNB's power class and can vary among UEs.

Figure 11:
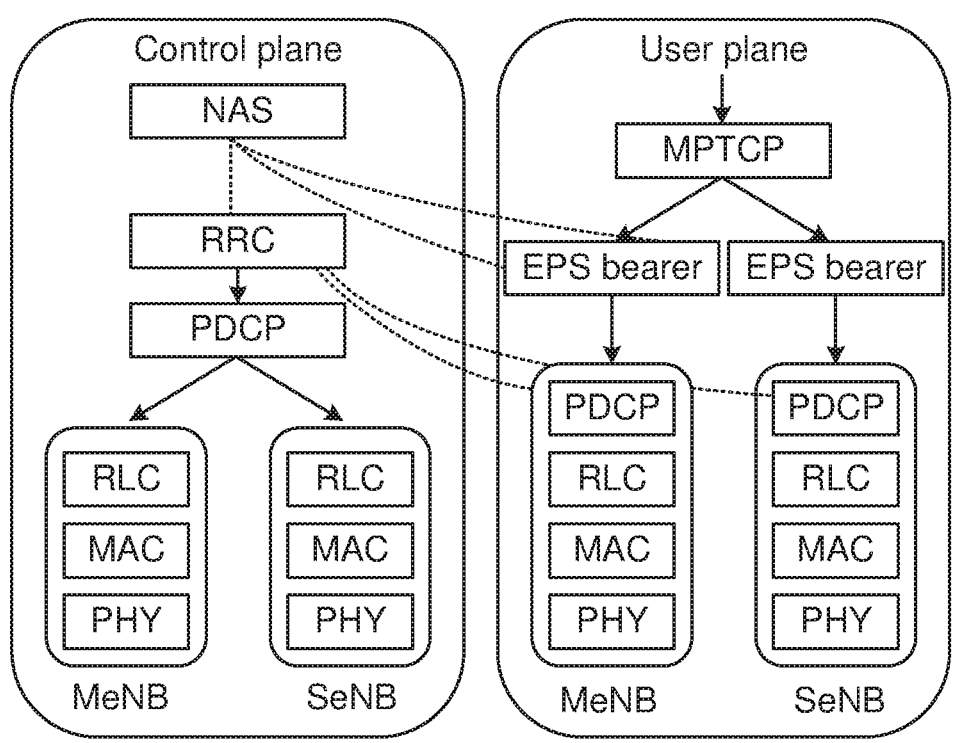
FIG. 11 is a block diagram illustrating a protocol architecture for multiple connectivity according to some embodiments.

To support multiple connectivity to micro and pico nodes, several architectural options are possible both for the control and user planes. For the user plane, a centralized approach may be provided where the PDCP (or even the RLC) is terminated at the anchor node only and the booster node terminates at the RLC (or even the MAC) level. A decentralized approach may be to have the booster to terminate at the PDCP level. A similar approach can be taken in the control plane (i.e., distributed or centralized PDCP/RLC) but on top of that the additional dimension of centralizing or distributing the RRC may be provided. FIG. 11 shows example control and user plane architectures where the user plane uses distributed PDCP, while the control plane is centralized at the PDCP level at the anchor node. Note that in FIG. 11, user plane aggregation (i.e., the possibility to split the packets belonging to one application data flow over the anchor and booster links) can be realized by using a higher layer aggregation protocol like multi-path TCP (MPTCP).

Random access (RA) serves as an uplink control procedure to enable the UE to access the network. The RA procedures serve three main purposes:

The RA procedures let the UE align its uplink (UL) timing to that expected by the eNodeB in order to minimize interfering with other UEs transmissions. UL time alignment is a requirement in E-UTRAN before data transmissions can commence.

The RA procedures provide a means for the UE to notify the network of its presence and enable the eNodeB to give the UE initial access to the system.

The RA procedures notify the eNB that the UE has data in its uplink buffer.

In addition to its usage during initial access, the RA procedures are also used when the UE has lost the uplink synchronization.

Figure 12:
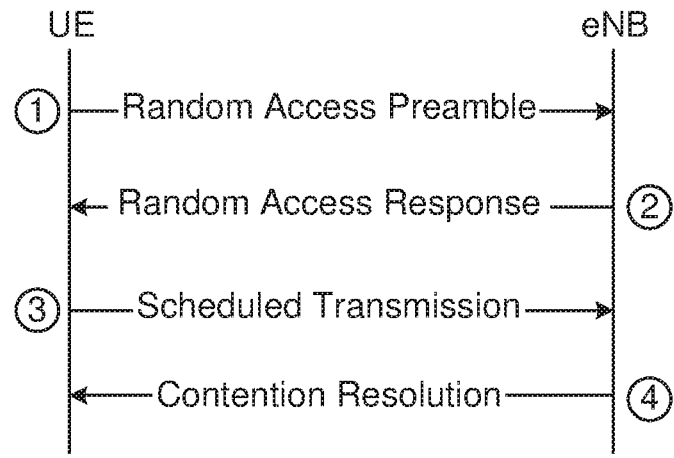
FIG. 12 is a signal flow diagram illustrating a contention-based random access procedure in LTE.

The basic RA Procedure is a four-phase procedure as outlined in FIG. 12, thus illustrating Contention based Random Access Procedure in LTE.

Phase 1 consists of transmission of a random access preamble by the UE, allowing the Node B to estimate the transmission timing of the UE. Uplink synchronization is necessary as the UE otherwise cannot transmit any uplink data. The preamble used in this step can be either randomly selected by the UE in contention-based Random Access procedures, or dedicated by the network in contention-free Random Access procedures. The latter solution can be used in case of handover, for example, when the target eNB may signal dedicated random access information to the source eNB, which will further convey that information to the UE.

Phase 2 consists of the network transmitting the Random Access Response message. This message includes the timing advance command to correct the uplink timing, based on the timing of arrival measurement in the first step. In addition to establishing uplink synchronization, the second step also assigns uplink resources. In the case of contention based random access, a temporary identifier to the UE is included, to be used in the third step in the random access procedure.

Phase 3 consists of signalling from the UE to the eNB, also called as Msg3. This step is included in contention-based Random Access. A primary function of this message is to uniquely identify the UE. The exact content of this signalling depends on the state of the UE, e.g., whether it is previously known to the network or not. In connected state, the UE includes at least its C-RNTI in the Msg3.

Phase 4, the final phase, is responsible for contention resolution to solve the potential case when in case multiple UEs tried to access the system on the same resource. This phase is used in contention-based Random Access procedure.

Phase 1—Random Access Preamble

The UE obtains information about which preambles are available (either to select one at random or to use a specified one), whether one or repeated preambles should be used, what the desired received power level should be at the base station, what power increase step should be used in case of failed preamble reception, what the maximum number of random access preamble transmission is, when it is allowed to transmit the preamble, etc.

If the UE obtains the Phase I information via dedicated signaling, such as when random access is performed as part of handover (the dedicated signaling originated from the target cell, forwarded to the UE by the serving cell), a specific preamble may be configured. In addition, the timer T304 is started with a value provided by the dedicated signaling.

The UE determines a random access resource for preamble transmission in consideration of the retrieved information. Either, the information is related to the downlink synchronization of the serving cell, or related to a non-serving cell. The latter can be the case when random access is used to get established in a target cell during handover.

Phase 2—Random Access Response

The UE monitors PDCCH of the cell for random access response in the RA response window, which starts at the subframe that contains the end of the preamble transmission plus three subframes and has the length ra-ResponseWindowSize.

If no response has been received, and the max number of preamble transmissions has been reached, or the timer T304 has expired, the handover attempt is considered failed and higher layer is informed. Then, the UE initiates the RRC connection reestablishment procedure to restore the connection to the source cell, specifying the reestablishment cause to handover failure. Furthermore, a radio link failure report is prepared.

Control Plane Protocol Termination for Dual Connectivity

Figure 13:
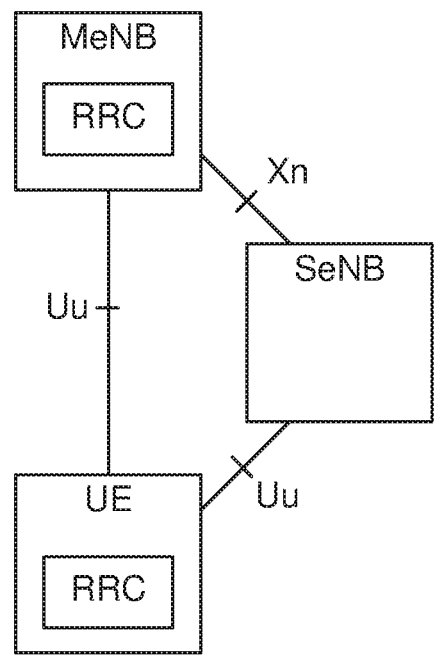
FIG. 13 is a schematic diagram illustrating control plane termination for dual connectivity, according to some embodiments.

There are currently different options for control plane termination for dual connectivity. The option considered here is where the UE has one single RRC entity, which communicates with a single RRC entity located in the MeNB on the network side. This is shown in FIG. 13 (Control plane termination for dual connectivity). In this scenario, all control signaling between the UE and the network terminates in the MeNB. Only the MeNB generates the final RRC messages to be sent towards the UE after coordination of RRM functions between MeNB and SeNB. The UE RRC entity sees all messages coming only from one entity (in the MeNB) and the UE only replies back to that entity.

Note, that one option could foresee a "virtual RRC" entity in the SeNB that generates parts of the RRC message to be finally sent to the UE by the MeNB. This scheme is similar to the case of handover (HO), where the target eNB generates the RRC message to be sent to the UE by the source eNB. The difference between the dual-connectivity situation scenario presented here and HO is that in the former scenario the MeNB may need to check the contents of the partial RRC message and assemble the final RRC message.

In the following, it can be assumed that each node controls its own radio resources. This is necessary, since an eNB acting as SeNB towards one UE may at the same time act as MeNB towards another UE. In other words, MeNB and SeNB are UE-specific roles of an eNB. Thus, to ensure efficient usage of radio resources, each eNB must be in control of its own radio resources and a distributed Radio Resource Management (RRM) needs to be assumed.

Negotiating Parameters Between SeNB and MeNB

There is a need for a procedure between the MeNB and the SeNB to agree on the UE radio resource configuration. For instance, a procedure is needed to enable the setup, the modification or the handover of a UE bearer for which radio resources are provided by a radio network node (SeNB) that is different from the radio network node (MeNB) that hosts the RRC connection and the connection to the core network. In addition, there might be a need to modify the physical or MAC layer RRC configuration used in the SeNB.

One important thing to consider here are the UE capabilities. The UE capabilities indicate whether the UE supports some features (static), but also indicate what is the maximum amounts of certain radio resources that can be allocated (dynamically) to the UE (e.g., number of ROHC context sessions).

Figure 14:
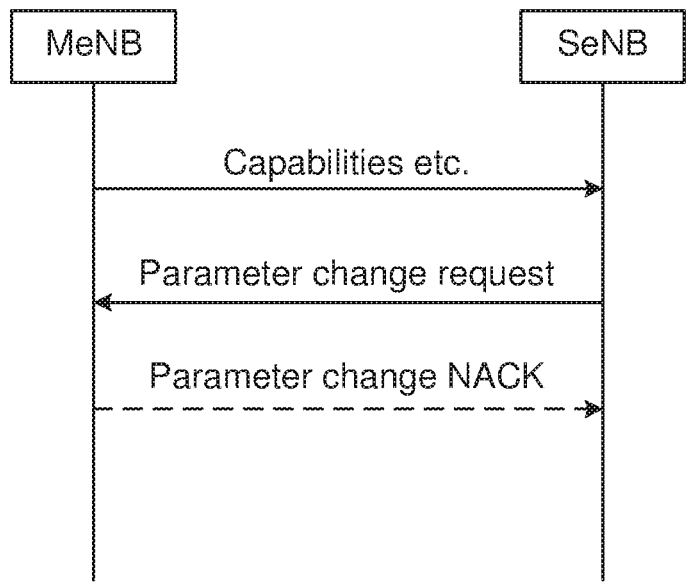
FIG. 14 is a signal flow diagram illustrating an example procedure for parameter negotiation between a master eNB and a secondary eNB.

FIG. 14 illustrates a procedure for parameter negotiation between MeNB and SeNB. The assumed procedure for negotiating radio resource configuration of the connection between the UE and the SeNB is shown in FIG. 14, and involves the following steps:

1. MeNB provides current radio resource configurations and capabilities of the UE for the SeNB (over Xn). This may be done within the message that triggers the setup of resources within the SeNB.

2. The SeNB decides the radio resource configuration relevant for the SeNB and signals this to the MeNB (over Xn). This may be done in response to the message triggering the setup of resources within the SeNB or during triggering the modification of already established resources.

3. The MeNB either accepts the radio resource configuration relevant for the SeNB, or rejects it and sends a NACK to the SeNB If the parameter negotiation function was triggered during setup/HO of resources towards the SeNB, there might not be the need for an explicit ACK. In case of resource modification, if the radio resource configuration is accepted by the MeNB, it replies ACK back to the SeNB. If not, a NACK is sent.

Benefits of this solution comprise:

the current model with SRB1/SRB2 is sufficient

It requires only one set of PDCP encryption keys for control plane

One entity takes the final decision→no risk of exceeding capabilities

No need for parallel procedures for the UE (current model applies)

Figure 15:
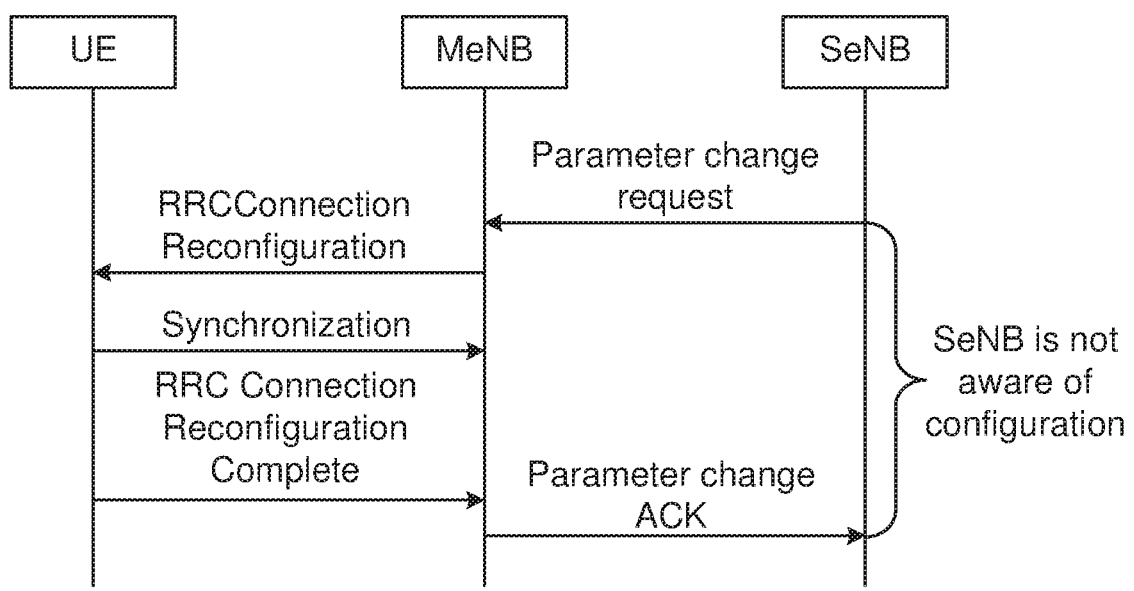
FIG. 15 is a signal flow diagram illustrating an example procedure for configuring a mobile terminal connection towards a secondary eNB.

However, there is one issue with the single RRC entity solution, which relates to the reconfiguration of the connection between the UE and the SeNB. The SeNB does not know when the UE has received the RRCConnectionReconfiguration and applied it. This is shown in FIG. 15, i.e. configuration of UE connection towards SeNB.

Currently, according to Release 8 of the 3GPP specifications, the eNB can know the exact time when the UE applies by RRC configuration only if RRCConnectionReconfiguration is equipped with mobilityControlInfo and the UE triggers Random Access when it applies the configuration.

With dual connectivity, activation of the new configuration might be more problematic:

Only the MeNB knows when RRCReconfiguration has been applied (based on L2 feedback+max. processing time or based on Random Access)

The it eNB needs to inform the SeNB that it has received RA from the UE. However, meanwhile the UE may continue to use radio resources of the SeNB. The configuration for this communication can be old or new, which is not known by the SeNB. One possibility would be to indicate an activation time, as used in e.g. 3G/HSPA. However, such an activation time must be set conservatively to ensure the UE will receive the configuration before activation, and thus this increases the delay of radio resource reconfiguration. Thus it would be preferable to have a solution without such an activation time.

Detailed below are mechanisms to overcome these problems related to configuration of the UE connection towards SeNB. Restated, the problem addressed with these mechanisms is related to dual connectivity in LTE Rel-12. A connection between the UE and secondary eNB is setup by the master eNB on the initiative of the secondary eNB. Radio resource configuration of the secondary eNB can be also updated, in which case the signaling can be performed by the master eNB based on input from the secondary eNB. However, the secondary eNB does not know when the UE has received the connection configuration info from the master eNB, and therefore cannot know when to start communicating with the UE or when the UE has applied the new configuration. The embodiments described below solve this problem.

In short, the solution according to some of these embodiments is to let the UE perform a random access towards the SeNB, rather than towards the MeNB, to indicate that it has received and applied the new configuration. In this way, the SeNB will know that the UE has changed to the new configuration.

Figure 16:
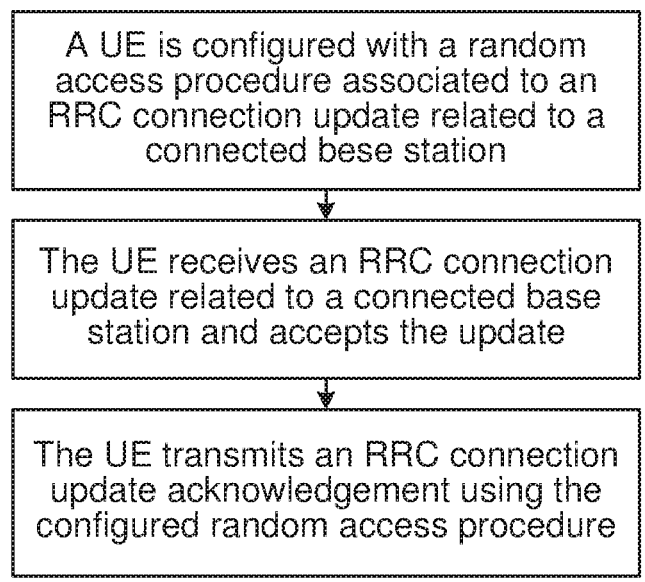
FIG. 16 is a process flow diagram illustrating steps of an example technique from a mobile terminal perspective.
Figure 17:
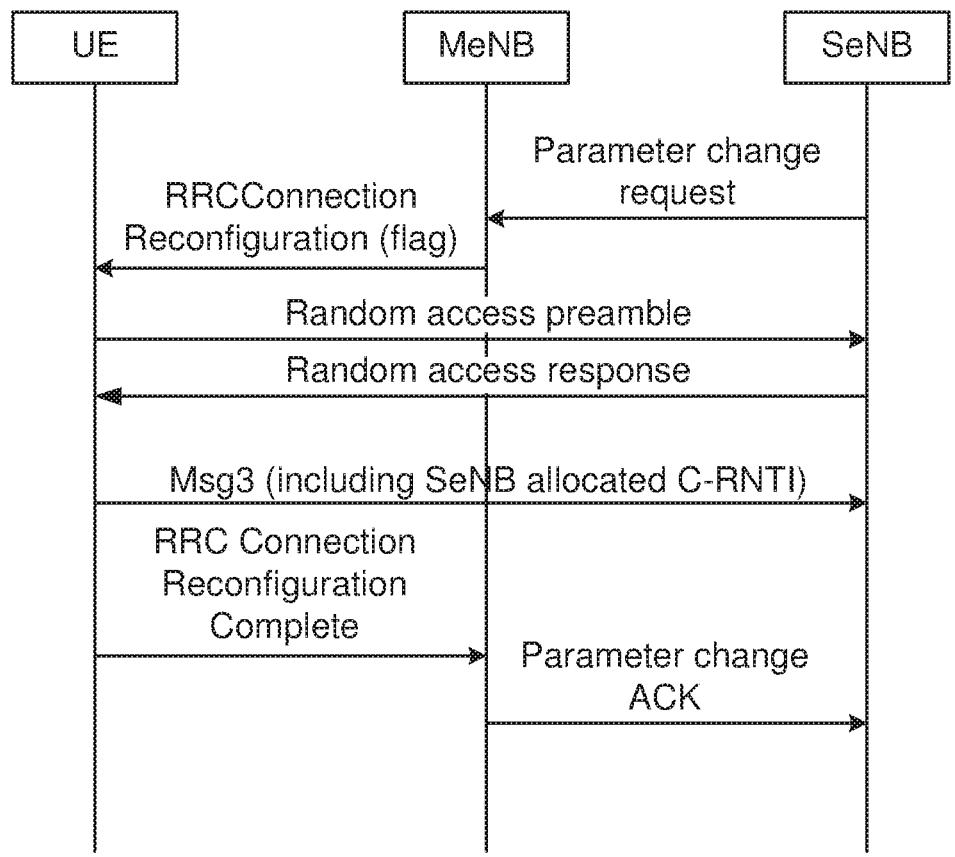
FIG. 17 is a signal flow diagram illustrating an example procedure for changing configuration of the connection between a mobile terminal and a secondary eNB.

Examples of these general principles are shown in FIG. 16 and FIG. 17, which illustrate the main steps of an example technique from a mobile terminal perspective and a signal flow diagram illustrating the present techniques, respectively. FIG. 17 illustrates a procedure for changing configuration of the connection between UE and SeNB, and it is noted that message names are given as examples.

In several embodiments, the method involves the following steps:
1. MeNB provides current radio resource configuration and capabilities of the UE to the SeNB (over Xn)
2. The SeNB decides the radio resource configuration relevant for the SeNB and signals this to the MeNB (over Xn) (compare arrow "Parameter change request" of FIG. 17).
3. The MeNB accepts the radio resource configuration relevant for the SeNB, includes possible changes to the radio resource configuration relevant to the MeNB and transmits this to the UE (compare arrow "RRCConnection reconfiguration" of FIG. 17). If changes are made, these are communicated back to the SeNB.
4. The UE receives and decodes the configuration message and determines that it includes a change of the configuration of the connection towards the SeNB. This determination can be based on implicit or explicit instruction in the configuration message.

i. The configuration message may include the Information Element (IE): MobilityControlInformation
ii. The configuration message may include a dedicated random access preamble to be used to acknowledge the configuration change towards the SeNB.
iii. The configuration message may also include a specific C-RNTI to be used in msg3 of the random access procedure
iv. The configuration may include a separate flag triggering a random access procedure towards the SeNB.
5. The UE applies the new SeNB configuration
6. The UE performs (initiates) a random access procedure towards SeNB to indicate that is has taken the new configuration into use (compare arrow "Random access preamble" of FIG. 17).
i. The random access preamble can be a dedicated preamble, if provided by the network. By using a dedicated preamble, the SeNB will be able to detect that the random access is to accept the new UE configuration. However, due to the limited number of available preambles, this may not always be a feasible solution.
ii. SeNB responds with random access response (compare arrow "Random access response" of FIG. 17), including RA-RNTI and Time Alignment (TA) information.
iii. If the UE was not allocated with the dedicated preamble, the UE sends a Msg3 includes a C-RNTI for contention resolution (compare arrow "Msg3 (including SeNB allocated C-RNTI)" of FIG. 17). In this disclosure, the C-RNTI would be assigned by SeNB, and will identify the UE in the SeNB. In an alternative embodiment, The C-RNTI can also be configured by the MeNB. It can for example be configured separately when the SeNB connection is established, it could have been associated with a C-RNTI that is used by UE for acknowledging RRC updates towards SeNB
7. The UE completes the procedure by sending the RRCConnectionReconfigurationComplete message to the MeNB (compare arrow "RRC Connection Reconfiguration Complete" of FIG. 17).
8. The MeNB signals tile parameter change ACK to the SeNB (compare arrow "Parameter change ACK" of FIG. 17).

It is noted that the order in which the UE performs (initiates) tile random access procedure towards the SeNB (under point 6 above) and sends the RRCConnectionReconfigurationComplete message to the MeNB (under point 7 above) may alternatively be the opposite (i.e. sending RRCConnectionReconfigurationComplete message to the MeNB before performing (initiates) the random access procedure towards the SeNB).

The random access procedure can be performed (initiated) differently in different embodiments. In one embodiment, the UE is allocated with one C-RNTI for MeNB. Then when the UE is connected to the SeNB, a separate C-RNTI can be allocated. Finally, the UE can be allocated yet another specific C-RNTI which is used only in the synchronization towards the SeNB as described below. By this way the SeNB can identify both the UE but also that the UE has updated the RRC configuration.

In dual connectivity thus, two C-RNTIs may be independently allocated: one for the MeNB and one for SeNB.

In one embodiment, the UE establishes downlink synch with the SeNB and transmits the RA preamble using a RA configuration to the SeNB, and will monitoring a response from SeNB. One example is when the SeNB is operating a cell on a different carrier than the MeNB, but it could also be the same.

In another embodiment, the UE maintains downlink synch with MeNB and transmits the RA preamble using a RA configuration to the MeNB. The SeNB is configured to monitor RA resources associated to the MeNB and will detect RA preamble transmitted using the MeNB configuration for RA. Thereby, the UE does not need to establish downlink synch with SeNB, which can be important for example when MeNB and SeNB are operating on the same carrier. Also, the UE will be able to maintain communication with the MeNB rather than having to interrupt data channel communication with MeNB in order to perform (initiate) RA with SeNB.

Figure 18:
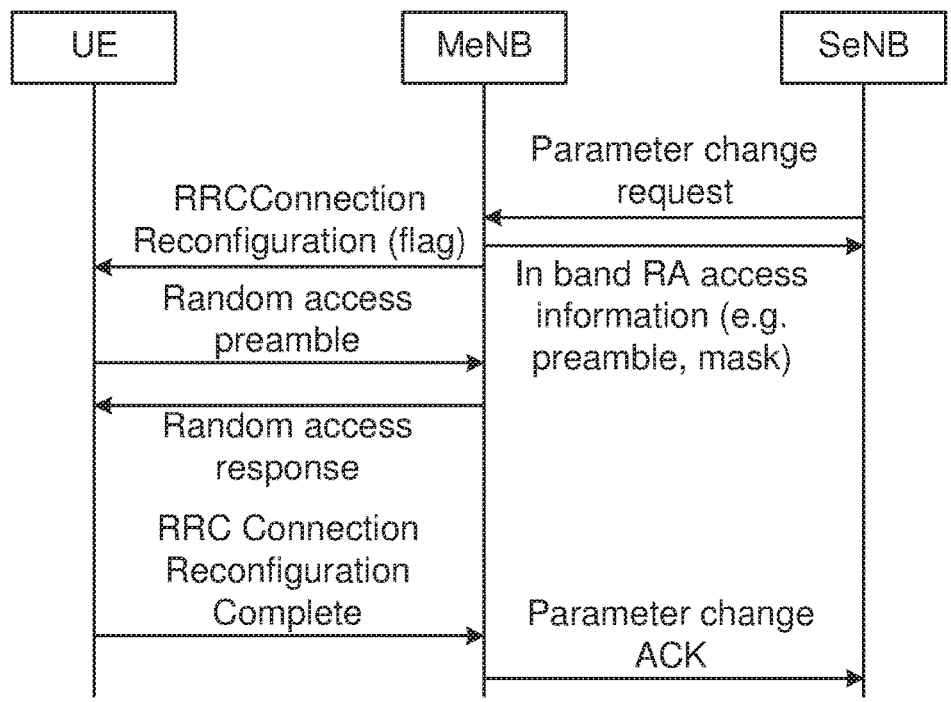
FIG. 18 is a signal flow diagram illustrating another example procedure for configuring a mobile terminal connection towards a secondary eNB.

In this embodiment the MeNB can provide extra details to the SeNB after receiving a Parameter Change Request (as per FIG. 17). This extra information concerns the RA procedure to be invoked between the UE and the MENB and may consist of the RACH preamble, mask index and time-frequency domain resources used by the UE to perform (initiate) the RA on the MeNB. An example of the messages involved in this procedure is shown in FIG. 18 (it is again noted that message names are given as examples).

A procedure is thus provided for changing the SeNB connection configuration in a dual connectivity setup. The procedure includes a method for ensuring that SeNB and UE move to the new configuration at the same time.

The advantage of this technique is that it provides a procedure for the SeNB to know exactly when the UE has applied the new configuration provided by the SeNB, without the need for the SeNB to make any assumptions or to unnecessarily wait for a certain pre-determined point in time.

Hardware Implementations

Figure 19:
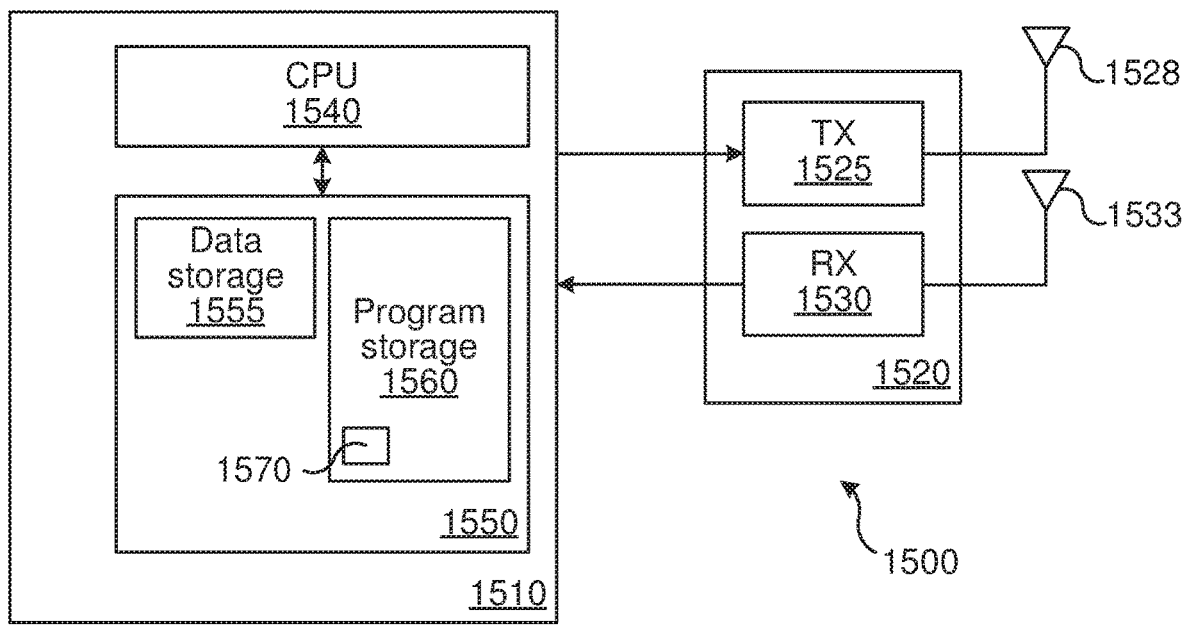
FIG. 19 is a block diagram illustrating elements of an example mobile terminal, according to some embodiments.

Several of the techniques and methods described above may be implemented using radio circuitry and electronic data processing circuitry provided in a terminal. FIG. 19 illustrates features of an example terminal 1500 according to several embodiments of the present invention. Terminal 1500, which may be a UE configured for dual-connectivity operation with an LTE network (E-UTRAN), for example, comprises a transceiver unit 1520 for communicating with one or more base stations as well as a processing circuit 1510 for processing the signals transmitted and received by the transceiver unit 1520. Transceiver unit 1520 includes a transmitter 1525 coupled to one or more transmit antennas 1528 and receiver 1530 coupled to one or more receiver antennas 1533. The same antenna(s) 1528 and 1533 may be used for both transmission and reception. Receiver 1530 and transmitter 1525 use known radio processing and signal processing components and techniques, typically according to a particular telecommunications standard such as the 3GPP standards for LTE. Note also that transmitter unit 1520 may comprise separate radio and/or baseband circuitry for each of two or more different types of radio access network, such as radio/baseband circuitry adapted for E-UTRAN access and separate radio/baseband circuitry adapted for Wi-Fi access. The same applies to the antennas—while in some cases one or more antennas may be used for accessing multiple types of networks, in other cases one or more antennas may be specifically adapted to a particular radio access network or networks. Because the various details and engineering tradeoffs associated with the design and implementation of such circuitry are well known and are unnecessary to a full understanding of the disclosure, additional details are not shown here.

Processing circuit 1510 comprises one or more processors 1540 coupled to one or more memory devices 1550 that make up a data storage memory 1555 and a program storage memory 1560. Processor 1540, identified as CPU 1540 in FIG. 19, may be a microprocessor, microcontroller, or digital signal processor, in some embodiments. More generally, processing circuit 1510 may comprise a processor/firmware combination, or specialized digital hardware, or a combination thereof. Memory 1550 may comprise one or several types of memory such as read-only memory (ROM), random-access memory, cache memory, flash memory devices, optical storage devices, etc. Because terminal 1500 supports multiple radio access networks, processing circuit 1510 may include separate processing resources dedicated to one or several radio access technologies, in some embodiments. Again, because the various details and engineering tradeoffs associated with the design of baseband processing circuitry for mobile devices are well known and are unnecessary to a full understanding of the disclosure, additional details are not shown here.

Typical functions of the processing circuit 1510 include modulation and coding of transmitted signals and the demodulation and decoding of received signals. In several embodiments of the present disclosure, processing circuit 1510 is adapted, using suitable program code (e.g. in the form of a computer program 1570) stored in program storage memory 1560, for example, to carry out one of the techniques described above for access network selection. Of course, it will be appreciated that not all of the steps of these techniques are necessarily performed in a single microprocessor or even in a single module.

Figure 20:
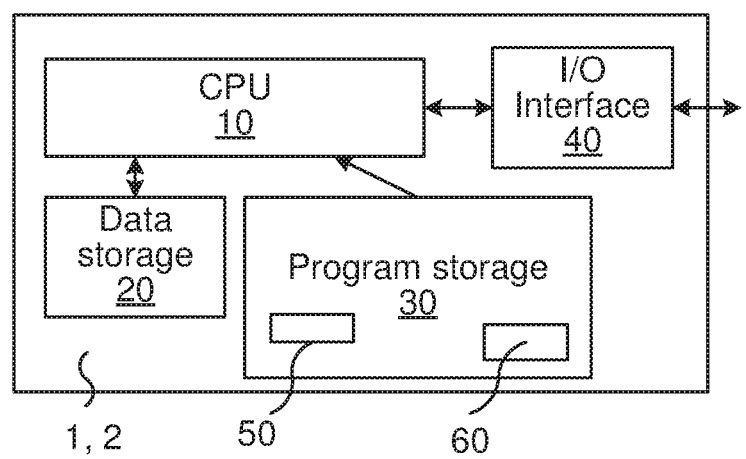
FIG. 20 is a block diagram illustrating elements of an example wireless network node, according to some embodiments.

Similarly, several of the techniques and processes described above can be implemented in a network node, such as an eNodeB or other node in a 3GPP network. FIG. 20 is a schematic illustration of a node 1 in which a method embodying any of the presently described network-based techniques can be implemented. A computer program 50, 60 for controlling the node 1 to carry out a method embodying the present invention is stored in a program storage 30, which comprises one or several memory devices. Data used during the performance of a method embodying the present invention is stored in a data storage 20, which also comprises one or more memory devices. During performance of a method embodying the present invention, program steps are fetched from the program storage 30 and executed by a Central Processing Unit (CPU) 10, retrieving data as required from the data storage 20. Output information resulting from performance of a method embodying the present invention can be stored back in the data storage 20, or sent to an Input/Output (I/O) interface 40, which includes a network interface for sending and receiving data to and from other network nodes and which may also include a radio transceiver for communicating with one or more terminals.

Accordingly, in various embodiments of the invention, processing circuits, such as the CPU 10 and memory circuits 20 and 30 in FIG. 20, are configured to carry out one or more of the techniques described in detail above. Likewise, other embodiments may include radio network controllers including one or more such processing circuits. In some cases, these processing circuits are configured with appropriate program code, stored in one or more suitable memory devices, to implement one or more of the techniques described herein. Of course, it will be appreciated that not all of the steps of these techniques are necessarily performed in a single microprocessor or even in a single module.

Figure 21:
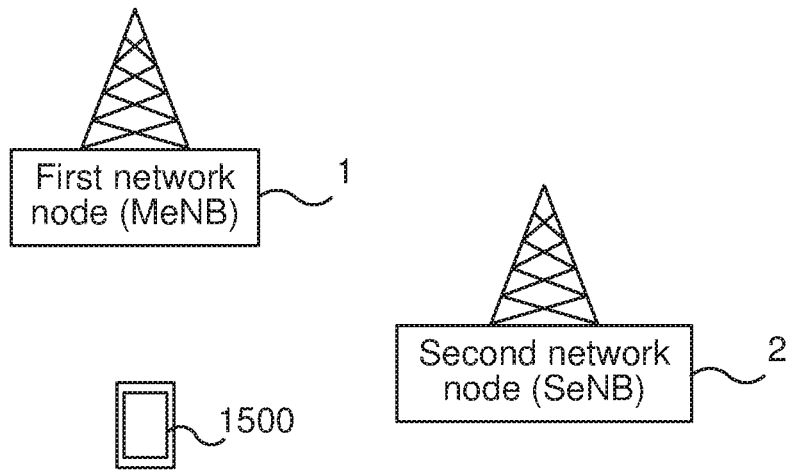
FIG. 21 illustrates schematically an environment in which embodiments of the present disclosure may be implemented.

FIG. 21 illustrates schematically an environment in which embodiments of the present disclosure may be implemented. As described earlier, a communication system may comprise a number of network nodes 1, 2 providing wireless communication for wireless devices 1500. The network nodes 1, 2 may comprise base stations, e.g. eNBs communicating over a wireless interface with the wireless devices 1500 and over a wired connection with each other.

Figure 22:
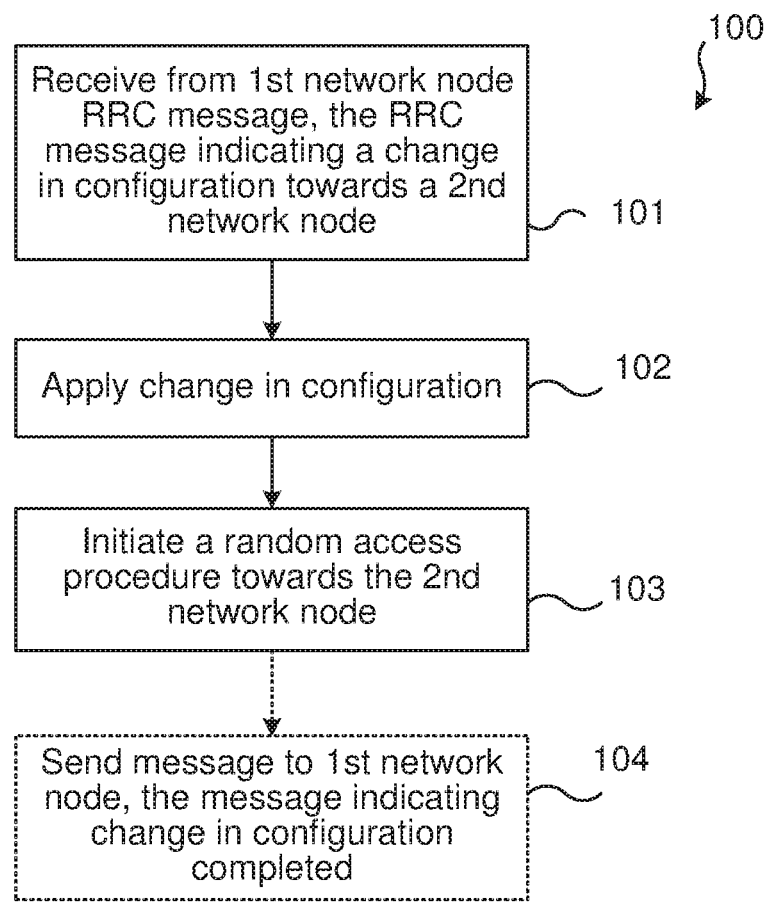
FIG. 22 is a flow chart over steps of a method in a wireless device in accordance with an aspect of the present disclosure.

FIG. 22 is a flow chart over steps of a method in a wireless device 1510 in accordance with an aspect of the present disclosure. The method 100 be performed in the wireless device 1500 for handling connectivity to two network nodes 1, 2. The method 100 comprises receiving 101, from a first network node 1, a radio resource configuration message, the radio resource configuration message indicating a change in configuration of a connection towards a second network node 2.

The method 100 comprises applying 102 the change in configuration towards the second network node 2 in response to the radio resource configuration message.

The method too comprises initiating 103 a random access procedure towards the second network node 2 after applying the change in configuration. Such initiating may comprise transmitting a random access preamble.

By initiating the random access procedure towards the second network node 2, upon having executed the reconfiguration, the second network node 2 is made aware of the fact that the wireless device 1500 has received and applied the new configuration, i.e. that the wireless device 1500 has changed to the new configuration (comprising connection(s) towards the second network node 2).

In an embodiment, the method 100 comprises sending 104 a message to the first network node 1, the message indicating that the change in configuration is completed.

In an embodiment, the method 100 comprises receiving, from the first network node 1, a message comprising information for initiating the random access procedure towards the second network node 2.

In a variation of the above embodiment, the information comprises a dedicated random access preamble and/or an identifier of the wireless device 1500 such as Cell Radio Network Temporary Identifier, C-RNTI, for the second network node 2.

In a variation of the above embodiment, the random access procedure comprises a contention free random access and the initiating 103 the random access procedure comprises:
establishing downlink synchronization towards the second network node 2 and
transmitting the received information to the second network node 2.

In a variation of the above embodiment, the method 100 comprises monitoring a response from the second network node 2.

In various embodiments, the information for initiating the random access procedure towards the second network node is included in the radio resource configuration message.

In an embodiment, the random access procedure comprises a contention based random access and the initiating 103 the random access procedure comprises:
transmitting a randomly selected random access preamble,
receiving a random access response comprising a random access code, such as Random Access Radio Network Temporary Identifier, RA-RNTI, from the second network node 2, and
transmitting, to the second network node 2, a message comprising an identifier of the wireless device 1500, the identifier comprising a Cell Radio Network Temporary Identifier, C-RNTI, assigned by the second network node 2.

In a variation of the above embodiment, the method 100 comprises receiving, from the second network node 2 a contention resolution message.

FIG. 19, described earlier, shows a wireless device 1500 which may be configured to perform the various embodiments of the method 100. A wireless device 1500 is thus, in an aspect, provided for handling connectivity to two network nodes 1, 2. The wireless device 1500 is configured to:
receive, from a first network node 1, a radio resource configuration message, the radio resource configuration message indicating a change in configuration of a connection towards a second network node 2,
apply the change in configuration towards the second network node 2 in response to the radio resource configuration message, and
initiate a random access procedure towards the second network node 2 after applying the change in configuration.

In an embodiment, the wireless device 1500 is configured to send a message to the first network node 1, the message indicating that the change in configuration is completed.

In an embodiment, the wireless device 1500 is configured to receive, from the first network node 1, a message comprising information for initiating the random access procedure towards the second network node 2.

In a variation of the above embodiment, the information comprises a dedicated random access preamble and/or an identifier of the wireless device 1500 such as Cell Radio Network Temporary Identifier, C-RNTI, for the second network node 2.

In a variation of the above embodiment, the random access procedure comprises a contention free random access and the wireless device 1500 is configured to initiate the random access procedure by:
establishing downlink synchronization towards the second network node 2 and
transmitting the received information to the second network node 2.

In a variation of the above embodiment, the wireless device 1500 is configured to monitor a response from the second network node 2.

In an embodiment, the information is included in the radio resource configuration message.

In an embodiment, the random access procedure comprises a contention based random access and the wireless device 1500 is configured to initiate the random access procedure by:
transmitting a randomly selected random access preamble,
receiving a random access response comprising a random access code, such as Random Access Radio Network Temporary Identifier, RA-RNTI, from the second network node 2, and
transmitting, to the second network node 2, a message comprising an identifier of the wireless device 1500, the identifier comprising a Cell Radio Network Temporary Identifier, C-RNTI, assigned by the second network node 2.

In a variation of the above embodiment, the wireless device 1500 is configured to receive, from the second network node 2 a contention resolution message.

The present disclosure also encompasses a computer program for implementing the embodiments of the method as described above in relation to FIG. 22. Such computer program 1570 may be used in a wireless device 1500 for handling connectivity to two network nodes 1, 2. The computer program 1570 comprises computer program code, which, when executed on at least one processor 1540 on the wireless device 1500 causes the wireless device 1500 to perform the method 100 as described in relation to FIG. 22.

The present disclosure also encompasses a computer program product 1560 comprising a computer program 1570 as described above and a computer readable means on which the computer program 1570 is stored. As mentioned earlier (compare description relating to FIG. 19), such computer program product 1560 may comprise (ROM), random-access memory, cache memory, flash memory devices, optical storage devices, etc.

Figure 23:
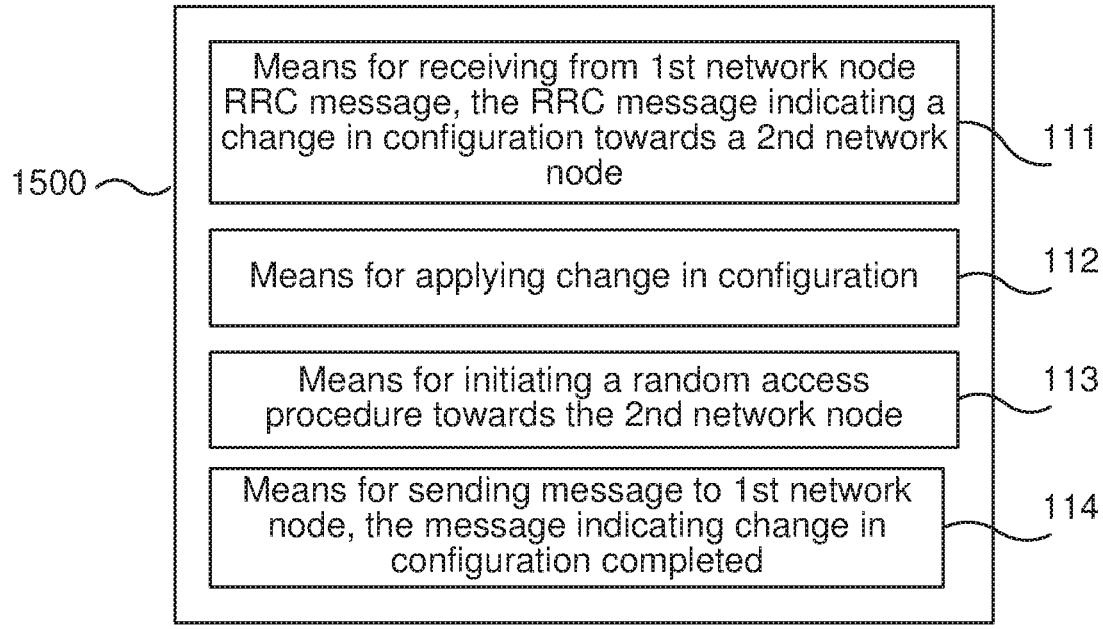
FIG. 23 illustrates a wireless device comprising function modules/software modules for implementing embodiments of the present disclosure.

An example of an implementation using function modules/software modules is illustrated in FIG. 23, in particular illustrating a wireless device 1500 comprising function modules and/or software modules for implementing embodiments of the method 100. The wireless device 1500 comprises first means, for example a first function module in, for receiving, from a first network node 1, a radio resource configuration message, the radio resource configuration message indicating a change in configuration of a connection towards a second network node 2. Such means may comprise processing circuitry receiving signaling via receiving circuitry and antenna(s) of the wireless device 1500 (refer also to description in relation to FIG. 19).

The wireless device 1500 comprises second means, for example a second function module 112, for applying the change in configuration towards the second network node 2 in response to the radio resource configuration message. Such means may comprise processing circuitry (refer also to description in relation to FIG. 19).

The wireless device 1500 comprises third means, for example a third function module 113, for initiating a random access procedure towards the second network node 2 after applying the change in configuration. Such means may comprise processing circuitry for transmitting signaling via transmitting circuitry and antenna(s) of the wireless device 1500 (refer also to description in relation to FIG. 19).

The wireless device 1500 may comprise yet additional means for performing the various steps of the method. For example, the wireless device 1500 may comprise a function module 114, for sending a message to the first network node 1, the message indicating that the change in configuration is completed. Yet additional means for performing the method may be included in the wireless device 1500.

The function modules/software modules 111, 112, 113, 114 can be implemented using software instructions such as computer program executing in a processor and/or using hardware, such as application specific integrated circuits, field programmable gate arrays, discrete logical components etc.

Figure 24:
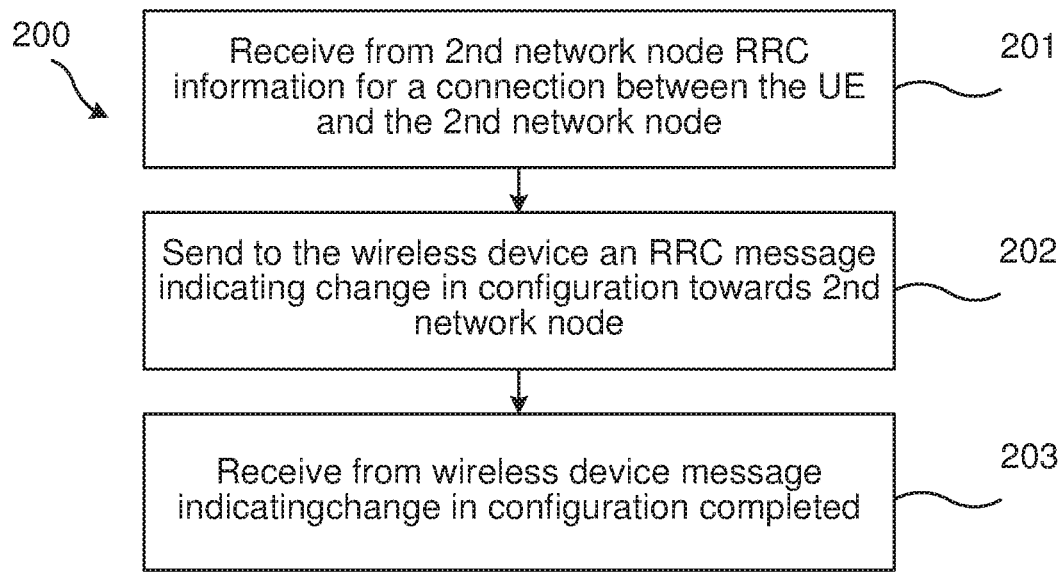
FIG. 24 is a flow chart over steps of a method in a first network node in accordance with an aspect of the present disclosure.

FIG. 24 is a flow chart over steps of a method in a first network node in accordance with an aspect of the present disclosure. The method 200 may be performed in a first network node 1, for managing connectivity of a wireless device 1500 to the first network node 1 and a second network node 2. The method 200 comprises:

receiving 201, from the second network node 2, radio resource configuration information for a connection between the wireless device 1500 and the second network node 2, sending 202 in response to and based on the radio resource configuration information received from the second network node 2, a radio resource configuration message to the wireless device 1500, the radio resource configuration message indicating a change in configuration of a connection towards the second network node 2, and receiving 203 a message from the wireless device (1500), the message indicating that the change in configuration is complete.

In an embodiment, the method 200 comprises sending a parameter change acknowledgement to the second network node 2, in response to the message indicating that the change in configuration is complete.

In an embodiment, the method 200 comprises, after the receiving 201 the radio resource configuration message, transmitting to the second network node 2 information about a random access procedure to be invoked between the wireless device 1500 and the first network node 1. By providing the second network node 2 information about the random access procedure, the second network node 2 is enabled to monitor the random access resources associated with the first network node 1, and may detect e.g. RA preambles (if included in the information) transmitted during the random access procedure between the wireless device 1500 and the first network node 1.

FIG. 20, described earlier, shows a network node 1 which may be configured to perform the various embodiments of the method 200. A first network node 1 is thus, in an aspect, provided for managing connectivity of a wireless device 1500 to the first network node 1 and a second network node 2. The first network node 1 is configured to:

receive, from the second network node 2, radio resource configuration information for a connection between the wireless device 1500 and the second network node 2, send in response to and based on the radio resource configuration information received from the second network node 2, a radio resource configuration message to the wireless device 1500, the radio resource configuration message indicating a change in configuration of a connection towards the second network node 2, and receive a message from the wireless device 1500, the message indicating that the change in configuration is complete.

In an embodiment, the first network node 1 is configured to send a parameter change acknowledgement to the second network node 2, in response to the message indicating that the change in configuration is complete.

In an embodiment, the first network node 1 is configured to, after the receiving 201 the radio resource configuration message, transmit to the second network node 2 information about a random access procedure to be invoked between the wireless device 1500 and the first network node 1. The present disclosure also encompasses a computer program for implementing the embodiments of the method as described e.g. above in relation to FIG. 24. The computer program 50 (see FIG. 20) may be used for a first network node 1 for managing connectivity of a wireless device 1500 to the first network node 1 and a second network node 2. The computer program 1570 comprises computer program code, which, when executed on at least one processor on the first network node 1 causes the first network node 1 to perform the method 200 as described in relation to FIG. 24.

The present disclosure also encompasses a computer program product 30 comprising a computer program 50 as above, and a computer readable means on which the computer program 50 is stored. As mentioned earlier (compare description relating to FIGS. 19 and 20), such computer program product 30 may comprise (ROM), random-access memory, cache memory, flash memory devices, optical storage devices, etc.

Figure 25:
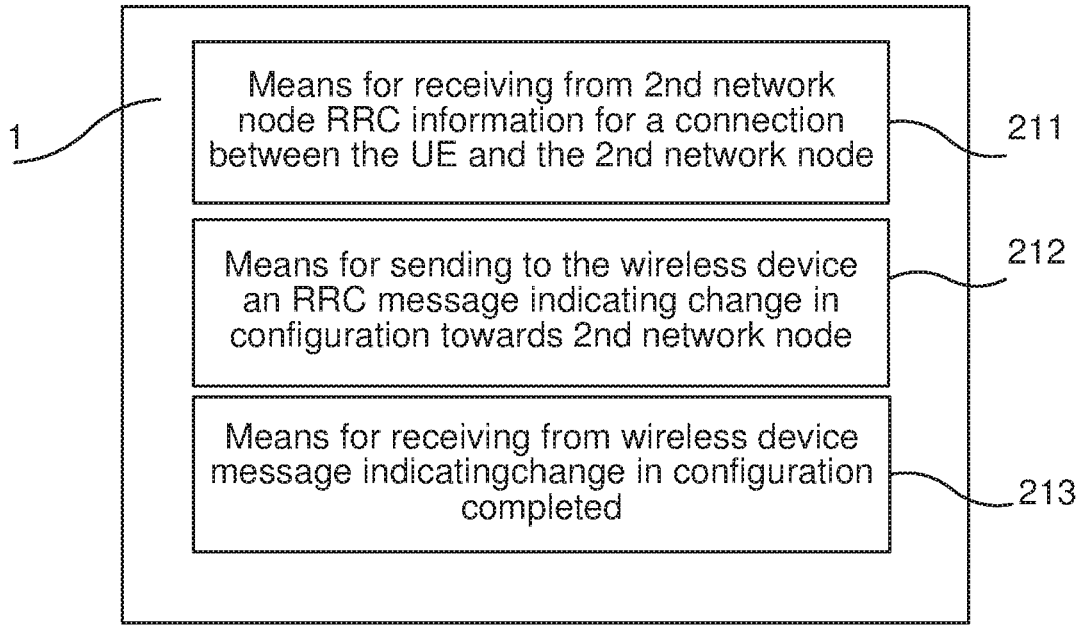
FIG. 25 illustrates a first network node comprising function modules/software modules for implementing embodiments of the present disclosure.

An example of an implementation using function modules/software modules is illustrated in FIG. 25, in particular illustrating a first network node 1 comprising function modules and/or software modules for implementing embodiments of the method 200. The first network node 1 comprises first means, for example a first function module 211, for receiving, from the second network node 2, radio resource configuration information for a connection between the wireless device 1500 and the second network node 2. Such means may comprise processing circuitry for receiving signals via an interface (refer also to description in relation to FIG. 20).

The first network node 1 comprises second means, for example a second function module 212, for sending in response to and based on the radio resource configuration information received from the second network node 2, a radio resource configuration message to the wireless device 1500, the radio resource configuration message indicating a change in configuration of a connection towards the second network node 2. Such means may comprise processing circuitry for transmitting signals via an interface (refer also to description in relation to FIG. 20).

The first network node 1 comprises third means, for example a third function module 213, for receiving a message from the wireless device 1500, the message indicating that the change in configuration is complete. Such means may comprise processing circuitry for receiving signals via an interface (refer also to description in relation to FIG. 20).

The first network node 1 may comprise yet additional means for performing the various steps of the method. For example, the first network node 1 may comprise a function module (not illustrated in FIG. 25), sending a parameter change acknowledgement to the second network node 2, in response to the message indicating that the change in configuration is complete. Yet additional means for performing the method may be included in the first network node 1.

The function modules/software modules 211, 212, 213 can be implemented using software instructions such as computer program executing in a processor and/or using hardware, such as application specific integrated circuits, field programmable gate arrays, discrete logical components etc.

Figure 26:
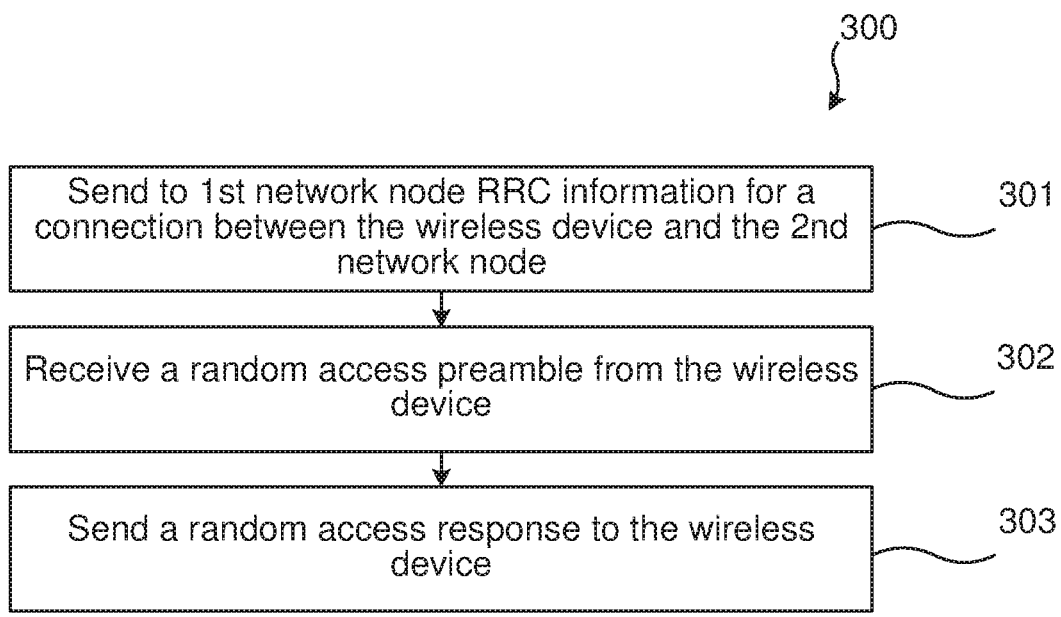
FIG. 26 is a flow chart over steps of a method in a second network node in accordance with an aspect of the present disclosure.

FIG. 26 is a flow chart over steps of a method in a second network node in accordance with an aspect of the present disclosure. The method 300 may be performed in a second network node 2, for managing connectivity of a wireless device 1500 to a first network node 1 and the second network node 2. The method 300 comprises:

sending 301, to the first network node 1, radio resource configuration information for a connection between the wireless device 1500 and the second network node 2, receiving 302 a random access preamble from the wireless device 1500, responsive to the radio resource configuration information, and sending 303 a random access response to the wireless device 1500.

In an embodiment, the method 300 comprises receiving a parameter change acknowledgement from the first network node 1.

In an embodiment, the sending 301 the radio resource configuration information comprises including a dedicated identifier for the wireless device 1500, the dedicated identifier comprising a Cell Radio Network Temporary Identifier, for the second network node 2.

In an embodiment, the receiving 302 comprises receiving the dedicated identifier comprising a Cell Radio Network Temporary Identifier, C-RNTI, for the second network node 2 for identifying the wireless device 1500.

FIG. 20, described earlier, shows a network node 2 which may be configured to perform the various embodiments of the method 300. A second network node 2 is thus, in an aspect, provided for managing connectivity of a wireless device 1500 to a first network node 1 and the second network node 2. The second network node 2 is configured to:

send, to the first network node 1, radio resource configuration information for a connection between the wireless device 1500 and the second network node 2, receive a random access preamble from the wireless device 1500, responsive to the radio resource configuration information, and send a random access response to the wireless device 1500.

In an embodiment, the second network node 2 is configured to receive a parameter change acknowledgement from the first network node 1.

In an embodiment, the sending 301 the radio resource configuration information comprises including a dedicated identifier for the wireless device 1500, the dedicated identifier comprising a Cell Radio Network Temporary Identifier, C-RNTI, for the second network node 2.

In an embodiment, the second network node 2 is configured to receive by receiving the dedicated identifier comprising a Cell Radio Network Temporary Identifier, C-RNTI, for the second network node 2 for identifying the wireless device 1500.

It is noted that the method 100 performed in a first network node, comprising e.g. a master eNB, and the method 200 performed in a second network node, comprising e.g. a secondary eNB, may both be implemented in one and the same network node. In particular, a network node, exemplified in the following by eNB, may be the master eNB for one wireless device while being the secondary eNB for another wireless device, and the network node would thus benefit from being configured to perform both methods 100, 200.

The present disclosure also encompasses a computer program for implementing the embodiments of the method as described e.g. above in relation to FIG. 26. The computer program 60 (see FIG. 20) may be used for a second network node 2 for managing connectivity of a wireless device 1500 to a first network node 1 and the second network node 2. The computer program 60 comprises computer program code, which, when executed on at least one processor on the second network node 2 causes the second network node 2 to perform the method 300 as described with reference to FIG. 26.

The present disclosure also encompasses a computer program product 30 comprising a computer program 60 as above, and a computer readable means on which the computer program 60 is stored.

Figure 27:
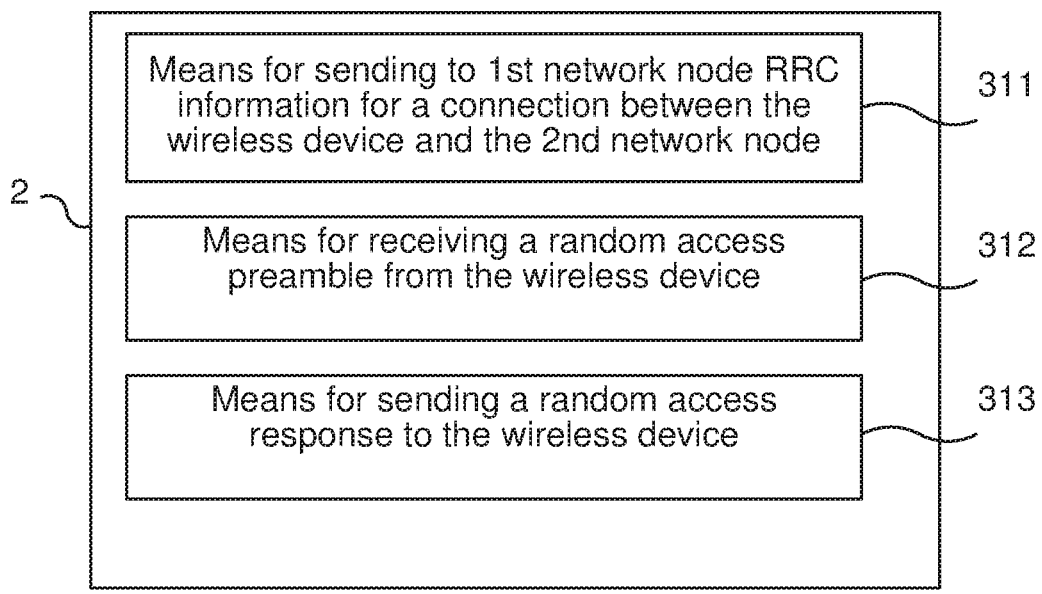
FIG. 27 illustrates a second network node comprising function modules/software modules for implementing embodiments of the present disclosure.

An example of an implementation using function modules/software modules is illustrated in FIG. 27, in particular illustrating a second network node 2 comprising function modules and/or software modules for implementing embodiments of the method 300. The second network node 2 comprises first means, for example a first function module 311, for sending, to the first network node 1, radio resource configuration information for a connection between the wireless device 1500 and the second network node 2. Such means may comprise processing circuitry for sending signals via an interface (refer also to description in relation to FIG. 20).

The second network node 2 comprises second means, for example a second function module 312, for receive a random access preamble from the wireless device 1500, responsive to the radio resource configuration information. Such means may comprise processing circuitry for receiving signals via an interface (refer also to description in relation to FIG. 20).

The second network node 2 comprises third means, for example a third function module 313, for sending a random access response to the wireless device 1500. Such means may comprise processing circuitry for sending signals via an interface (refer also to description in relation to FIG. 20).

The second network node 2 may comprise yet additional means for performing the various steps of the method. For example, the second network node 2 may comprise a function module (not illustrated in FIG. 27), sending the radio resource configuration information comprises including a dedicated identifier for the wireless device 1500, the dedicated identifier comprising a Cell Radio Network Temporary Identifier, C-RNTI for the second network node 2. Yet additional means for performing the method may be included in the second network node 2.

The function modules/software modules 311, 312, 313 can be implemented using software instructions such as computer program executing in a processor and/or using hardware, such as application specific integrated circuits, field programmable gate arrays, discrete logical components etc. It will be appreciated by the person of skill in the art that various modifications may be made to the above described embodiments without departing from the scope of the present invention. For example, although embodiments of the present invention have been described with examples that include a communication system compliant to the 3GPP specified LTE standard specification, it should be noted that the solutions presented may be equally well applicable to other networks that support dual connectivity. The specific embodiments described above should therefore be considered exemplary rather than limiting the scope of the invention. Because it is not possible, of course, to describe every conceivable combination of components or techniques, those skilled in the art will appreciate that the present invention can be implemented in other ways than those specifically set forth herein, without departing from essential characteristics of the invention. The present embodiments are thus to be considered in all respects as illustrative and not restrictive.

Embodiments of the inventive techniques and apparatus described above include, but are not limited to:

1. A method, in a mobile terminal, for handling connectivity to two base stations, the method comprising:
receiving, from a first base station, a radio resource configuration message, the radio resource configuration message indicating a change in configuration of a connection towards a second base station;
apply the change in configuration of the connection towards the second base station, in response to the radio resource configuration message;
performing a random access procedure towards the second base station, after applying the change in configuration;
sending a message to the first base station, the message indicating that the change in configuration is complete.

2. A method, in a first base station, for managing connectivity of a mobile terminal to the first base station and a second base station, the method comprising:
receiving, from the second base station, radio resource configuration information for a connection between the mobile terminal and the second base station;
in response to and based on the radio resource configuration information received from the second base station, sending a radio resource configuration message to the mobile terminal, the radio resource configuration message indicating a change in configuration of a connection towards the second base station;
receiving a message from the mobile terminal, the message indicating that the change in configuration is complete;
sending a parameter change acknowledgement to the second base station, in response to the message.

3. A method, in a second base station, for managing connectivity of a mobile terminal to a first base station and the second base station, the method comprising:
sending, to the first base station, radio resource configuration information for a connection between the mobile terminal and the second base station;
receiving a random access preamble from the mobile terminal, responsive to the radio resource configuration information;
sending a random access response to the mobile terminal; and
receiving a parameter change acknowledgement from the first base station.

It will be appreciated that other example embodiments include variations of and extensions to these enumerated methods, in accordance with the detailed procedures and variants described above.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts rioted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure, and shall not be restricted or limited by the foregoing detailed description.

Abbreviations:
3GPP 3rd Generation Partnership Project
AMBR Aggregate Maximum Bit Rate
ARP Allocation and Retention Priority
BCH Broadcast Channel
CIO Cell Individual Offset
CN Core Network
CRS Cell specific Reference Symbol
DL Downlink
DRB Data Radio Bearer
E-UTRAN Evolved UNITS Terrestrial Radio Access Network
eNB/eNodeB enhanced Node B(base station)
EPC Evolved Packet Core
EPS Evolved Packet System
GBR Guaranteed Bit Rate
HARQ Hybrid Automatic Repeat reQuest
HeNB Home eNB
IE Information Element
LTE Long Term Evolution
MAC Medium Access Control
MBR Maximum Bit Rate
MME Mobility Management Entity
MTCP Multi-path Transmission Control Protocol
NAS Non-Access Stratum
P-GW PDN Gateway
PCI Physical Cell Identity
PDCP Packet Data Convergence Protocol
PDN Packet Data Network
PDU Packet Data Unit
PSS Primary Synchronization Signal
QCI QoS Class Identifier
QoS Quality of Service
RLC Radio Link Control
RAB Radio Access Bearer
RE Resource Element
RRC Radio Resource Control
RRH Remote Radio Head
RRM Radio Resource Management
RS Reference Signal
RSCP Received Signal Code Power
RSRP Reference Signal Received Power
RSRQ Reference Signal Received Quality
S-GW Serving Gateway
SDF Service Data Flow
SDU Service Data Unit
SRB Signaling Radio Bearer
SSS Secondary Synchronization Signal
TTT Time To Trigger
UE User Equipment
UL Uplink

What is claimed is:

1. A method performed in a wireless device for handling connectivity to two network nodes in a dual connectivity setup, the wireless device being connected to a first network node and a second network node, the method comprising:

receiving, from the first network node, a radio resource configuration message, the radio resource configuration message indicating a change in configuration of the connection towards the second network node and comprising an identifier of the wireless device, the identifier comprising a Cell Radio Network Temporary Identifier (C-RNTI) for the second network node;

applying the change in configuration towards the second network node in response to the radio resource configuration message; and initiating a random access procedure towards the second network node responsive to applying the change in configuration, while maintaining connectivity with the first network node;

the random access procedure comprising a contention based random access and the method initiating the random access procedure by:

transmitting a randomly selected random access preamble to the second network node;

receiving a random access response comprising a random access code, such as a Random Access Radio Network Temporary Identifier (RA-RNTI), from the second network node; and transmitting, to the second network node, a message comprising the identifier of the wireless device, the identifier comprising the C-RNTI received from the first network node and assigned by the second network node.

2. The method of claim 1, comprising sending a message to the first network node, the message indicating that the change in configuration is completed.

3. The method of claim 1, comprising receiving, from the first network node, a message comprising information for initiating the random access procedure towards the second network node.

4. The method of claim 3, wherein the information comprises a dedicated random access preamble or an identifier of the wireless device or both for the second network node.

5. The method of claim 4, wherein the random access procedure comprises a contention free random access and the initiating the random access procedure comprises:

establishing downlink synchronization towards the second network node; and transmitting the received information to the second network node.

6. The method of claim 5, comprising monitoring a response from the second network node.

7. The method of claim 3, wherein the information is included in the radio resource configuration message.

8. A wireless device for handling connectivity to two network nodes in a dual connectivity setup, the wireless device being connected to a first network node and a second network node, the wireless device comprising:

a transmitter;
a receiver; and
a processor configured to:

receive, via the receiver, from the first network node, a radio resource configuration message, the radio resource configuration message indicating a change in configuration of the connection towards the second network node and comprising an identifier of the wireless device, the identifier comprising a Cell Radio Network Temporary Identifier (C-RNTI) for the second network node;

apply the change in configuration towards the second network node in response to the radio resource configuration message; and initiate a random access procedure towards the second network node responsive to applying the change in configuration by sending, via the transmitter, a random access message to the second network node, while maintaining connectivity with the first network node;

the random access procedure comprising a contention based random access and the method initiating the random access procedure by:

transmitting a randomly selected random access preamble to the second network node;

receiving a random access response comprising a random access code, such as a Random Access Radio Network Temporary Identifier (RA-RNTI), from the second network node; and transmitting, to the second network node, a message comprising the identifier of the wireless device, the identifier comprising the C-RNTI received from the first network node and assigned by the second network node.

9. The wireless device of claim 8, wherein the processor is further configured to send a message, via the transmitter, to the first network node, the message indicating that the change in configuration is completed.

10. The wireless device of claim 8, wherein the processor is further configured to receive, via the receiver, from the first network node, a message comprising information for initiating the random access procedure towards the second network node.

11. The wireless device of claim 10, wherein the information comprises a dedicated random access preamble or an identifier of the wireless device or both for the second network node.

12. The wireless device of claim 11, wherein the random access procedure comprises a contention free random access and the processor is further configured to initiate the random access procedure by:

establishing downlink synchronization towards the second network node; and transmitting, via the transmitter, the received information to the second network node.

13. The wireless device of claim 12, wherein the processor is further configured to monitor a response, received via the receiver, from the second network node.

14. The wireless device of claim 10, wherein the information is included in the radio resource configuration message.

15. A method performed in a first network node, for managing connectivity of a wireless device to the first network node and a second network node in a dual connectivity setup, the wireless device being connected to the first network node and the second network node, the method comprising:

receiving, from the second network node, radio resource configuration information for the connection between the wireless device and the second network node, the radio resource configuration information comprising an identifier for the wireless device, the identifier comprising a Cell Radio Network Temporary Identifier (C-RNTI) for the second network node;

sending in response to and based on the radio resource configuration information received from the second network node, a radio resource configuration message to the wireless device, the radio resource configuration message indicating a change in configuration of the connection towards the second network node and including the identifier for the wireless device;

transmitting, to the second network node, in response to the reception of the radio resource configuration information received from the second network node, information about a random access procedure to be invoked by the wireless device; and receiving a message from the wireless device, the message indicating that the change in configuration is complete.

16. The method of claim 15, comprising:
sending a parameter change acknowledgement to the second network node, in response to the message indicating that the change in configuration is complete.

17. The method of claim 15, wherein the random access procedure to be invoked is between the wireless device and the first network node.

18. A first network node for managing connectivity of a wireless device to the first network node and a second network node in a dual connectivity setup, the wireless device being connected to the first network node and the second network node, the first network node comprising:
a network interface;
a radio transceiver; and
a processor configured to:
receive, via the network interface, from the second network node, radio resource configuration information for the connection between the wireless device and the second network node, the radio resource configuration information comprising an identifier for the wireless device, the identifier comprising a Cell Radio Network Temporary Identifier (C-RNTI) for the second network node;

send, via the radio transceiver, in response to and based on the radio resource configuration information received from the second network node, a radio resource configuration message to the wireless device, the radio resource configuration message indicating a change in configuration of the connection towards the second network node and including the identifier for the wireless device;

transmit, via the network interface, to the second network node, in response to the reception of the radio resource configuration information, information about a random access procedure to be invoked by the wireless device; and receive, via the radio transceiver, a message from the wireless device, the message indicating that the change in configuration is complete.

19. The first network node of claim 18, configured to:
send, via the network interface, a parameter change acknowledgement to the second network node, in response to the message indicating that the change in configuration is complete.

20. The first network node of claim 18, wherein the random access procedure to be invoked is between the wireless device and the first network node.

* * * * *